US010944451B2

(12) United States Patent
Lim et al.

(10) Patent No.: US 10,944,451 B2
(45) Date of Patent: Mar. 9, 2021

(54) APPARATUS AND METHOD FOR OPERATING FULL-DUPLEX SCHEME IN COMMUNICATION SYSTEM SUPPORTING BEAM-FORMING SCHEME

(71) Applicant: Samsung Electronics Co., Ltd, Suwon-si (KR)

(72) Inventors: Jong-Bu Lim, Yongin-si (KR); Ji-Yun Seol, Seongnam-si (KR); Byung-Hwan Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 15/560,979

(22) PCT Filed: Mar. 14, 2016

(86) PCT No.: PCT/KR2016/002506
§ 371 (c)(1),
(2) Date: Sep. 22, 2017

(87) PCT Pub. No.: WO2016/153204
PCT Pub. Date: Sep. 29, 2016

(65) Prior Publication Data
US 2018/0083679 A1    Mar. 22, 2018

(30) Foreign Application Priority Data

Mar. 23, 2015  (KR) .................. 10-2015-0040112

(51) Int. Cl.
*H04B 7/06* (2006.01)
*H04B 17/345* (2015.01)
(Continued)

(52) U.S. Cl.
CPC ............. *H04B 7/0617* (2013.01); *H04B 7/06* (2013.01); *H04B 7/0632* (2013.01);
(Continued)

(58) Field of Classification Search
CPC .. H04B 7/0617; H04B 17/345; H04B 17/336; H04B 7/0632; H04B 7/06; H04B 7/0695; H04L 5/14; H04W 88/08
See application file for complete search history.

(56) References Cited

U.S. PATENT DOCUMENTS 8,412,106 B2 *  4/2013  da Silva ............... H04B 7/0621
                                                       455/63.4
8,948,100 B2   2/2015  Jeong et al.
(Continued)

FOREIGN PATENT DOCUMENTS

KR    10-2011-0085803 A    7/2011
KR    10-2014-0067275 A    6/2014
(Continued)

OTHER PUBLICATIONS

International Search Report dated Jun. 29, 2016 in connection with International Patent Application No. PCT/KR2016/002506.
(Continued)

*Primary Examiner* — Christine Ng

(57) ABSTRACT

The present invention relates to a $5^{th}$-generation (5G) or pre-5G communication system provided for supporting higher data transmission rates than 4th-generation (4G) communication system such as long term evolution (LTE). The present invention relates to a method in which an access point (AP) operates a full-duplex scheme in a communication system supporting a beam-forming scheme, the method comprising the steps of: generating a magnetic interference intensity table according to transmitted beam patterns and received beam patterns; determining, by the AP, a transmitted beam pattern and a received beam pattern for all stations (STAs) on the basis of channel measurement feedback information received from the stations, which provide service, and the electromagnetic-interference intensity table; and performing a communication operation with each of the
(Continued)

stations on the basis of the determined transmitted beam pattern and received beam pattern.

20 Claims, 20 Drawing Sheets

(51) Int. Cl.
 H04B 17/336 (2015.01)
 H04L 5/14 (2006.01)
 H04W 88/08 (2009.01)
(52) U.S. Cl.
 CPC ......... *H04B 7/0695* (2013.01); *H04B 17/336* (2015.01); *H04B 17/345* (2015.01); *H04L 5/14* (2013.01); *H04W 88/08* (2013.01)

(56) References Cited

U.S. PATENT DOCUMENTS

| | | | | |
|---|---|---|---|---|
| 2003/0146880 | A1* | 8/2003 | Chiang | ................ H01Q 1/246 343/853 |
| 2004/0224637 | A1 | 11/2004 | Silva et al. | |
| 2008/0045143 | A1 | 2/2008 | Yoshida et al. | |
| 2012/0201173 | A1 | 8/2012 | Jain et al. | |
| 2013/0223251 | A1* | 8/2013 | Li | ...................... H04W 72/046 370/252 |
| 2013/0301487 | A1 | 11/2013 | Khandani | |
| 2014/0146765 | A1 | 5/2014 | Ji et al. | |
| 2014/0148182 | A1* | 5/2014 | Jeong | ................... H04L 5/0026 455/452.1 |
| 2014/0185481 | A1* | 7/2014 | Seol | ...................... H04W 52/42 370/252 |
| 2014/0219139 | A1 | 8/2014 | Choi et al. | |
| 2015/0029904 | A1 | 1/2015 | Khojastepour et al. | |

FOREIGN PATENT DOCUMENTS

| | | |
|---|---|---|
| KR | 10-2014-0067780 A | 6/2014 |
| KR | 10-2014-0129051 A | 11/2014 |

OTHER PUBLICATIONS

Written Opinion of the International Searching Authority dated Jun. 29, 2016 in connection with International Patent Application No. PCT/KR2016/002506.

Office Action dated Dec. 14, 2020 in connection with Korean Patent Application No. 10-2015-0040112, 9 pages.

* cited by examiner

| Order | Information |
|---|---|
| 1 | Category |
| 2 | Unproteted DMG Action |
| 3 | Dialog Token |
| 4 | BRP Request field |
| 5 | DMG Beam Refinement element |
| 6 | Channel Measurement Feedback element 1 (optional) |
| ... | ... |
| 6+N-1 | Channel Measurement Feedback element N (optional) |

| | BS-FBCK | BS-FBCK Antenna ID | FBCK-REQ | FBCK-TYPE | MID Extension | Capability Request | Reserved |
|---|---|---|---|---|---|---|---|
| Bits. | 6 | 2 | 5 | 18 | 1 | 1 | 2 |

FIG.14

APPARATUS AND METHOD FOR OPERATING FULL-DUPLEX SCHEME IN COMMUNICATION SYSTEM SUPPORTING BEAM-FORMING SCHEME

CROSS-REFERENCE TO RELATED APPLICATION(S)

The present application claims priority under 35 U.S.C. § 365 to International Patent Application No. PCT/KR2016/002506 filed on Mar. 14, 2016, entitled "APPARATUS AND METHOD FOR OPERATING FULL-DUPLEX SCHEME IN COMMUNICATION SYSTEM SUPPORTING BEAM-FORMING SCHEME", and, to Korean Patent Application No. 10-2015-0040112 filed on Mar. 23, 2015, each of which are incorporated herein by reference into the present disclosure as if fully set forth herein.

TECHNICAL FIELD

The present disclosure relates to an apparatus and method for operating a full-duplex scheme in a communication system, and more particularly, to an apparatus and method for operating a full-duplex scheme in a communication system supporting a beamforming scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

A mobile communication system has been progressed to support higher data rates for satisfying demand for wireless data traffic which is continuously increased. For example, the mobile communication system has been progressed to improve a spectral efficiency and increase channel capacity based on various communication schemes such as an orthogonal frequency division multiplexing (OFDM) scheme, a multiple input multiple output (MIMO) scheme, and/or the like for increasing data rates.

The MIMO scheme is one of multiple antenna techniques using a plurality of antennas, and the multiple antenna techniques may be classified into two techniques, i.e., a technique which is applied to a low spatial fading correlation environment which corresponds to a high-rank channel environment and a technique which is applied to a high spatial fading correlation environment which corresponds to a low-lank channel environment. Here, the high-rank channel environment denotes a channel environment with a rank greater than or equal to, for example, L, the low-lank channel environment denotes a channel environment with a rank less than L, the low spatial fading correlation environment denotes a spatial fading correlation environment with a correlation value less than, for example, C, and the high spatial fading correlation environment denotes a spatial fading correlation environment with a correlation value greater than or equal to C.

In the high-rank channel environment, a scheme in which a signal transmitting operation and a signal receiving operation may be performed at the same time based on a self-interference channel matrix has been proposed. However, the scheme in which the signal transmitting operation and the signal receiving operation may be performed at the same time based on the self-interference channel matrix transmits or receives a desired signal using a null space of a self-interference channel in order to cancel self-interference at the expense of a spatial multiplexing gain.

However, the scheme in which the signal transmitting operation and the signal receiving operation may be performed at the same time based on the self-interference channel matrix may be applied when exactly recognizing the self-interference channel matrix, and may be applied to a channel environment with low spatial fading correlation environment.

The scheme in which the signal transmitting operation and the signal receiving operation may be performed at the same time based on the self-interference channel matrix needs to sacrifice a spatial multiplexing gain for canceling the self-interference, so it is difficult to be applied in a high spatial fading correlation environment which corresponds to a low-rank channel environment.

Meanwhile, demand for data traffic has been accelerated due to increase of demand for a smart phone and a personal computer (PC) and explosive increase of applications which require a large amount of traffic based on this. So, it is difficult to satisfy demand for wireless data traffic which is explosively increased only using communication schemes for improving a frequency efficiency.

So, various schemes have been proposed for solving explosive increase of demand for wireless data traffic, and a typical one is a beamforming scheme. The beamforming scheme may expand a service coverage by mitigating path loss of a radio wave to increase a propagation distance of the radio wave.

So, there is a need for a scheme of effectively operating a full-duplex scheme in a communication system supporting a beamforming scheme.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for operating a full-duplex scheme in a communication system supporting a beamforming scheme.

An embodiment of the present disclosure proposes an apparatus and method for operating a full-duplex scheme by considering self-interference strength in a communication system supporting a beamforming scheme.

An embodiment of the present disclosure proposes an apparatus and method for operating a full-duplex scheme by considering a direction-of-arrival (DoA) in a communication system supporting a beamforming scheme.

An embodiment of the present disclosure proposes an apparatus and method for operating a full-duplex scheme based on a beam selection/nulling scheme in a communication system supporting a beamforming scheme.

An embodiment of the present disclosure proposes an apparatus and method for operating a full-duplex scheme by considering a channel rank in a communication system supporting a beamforming scheme.

An embodiment of the present disclosure proposes an apparatus and method for operating a full-duplex scheme by considering fading correlation in a communication system supporting a beamforming scheme.

An embodiment of the present disclosure proposes a method for operating a full-duplex scheme by an access point (AP) in a communication system supporting a beamforming scheme, and the method comprises generating a self-interference strength table according to transmission beam patterns and reception beam patterns, determining a transmission beam pattern and a reception beam pattern for each of stations (STAs) based on channel measurement feedback information received from the STAs to which the AP provides a service and the self-interference strength table, and performing a communication operation with each of the STAs based on the determined transmission beam pattern and reception beam pattern.

An embodiment of the present disclosure proposes a method for operating a full-duplex scheme by a station (STA) in a communication system supporting a beamforming scheme, and the method comprises generating a self-interference strength table according to transmission beam patterns and reception beam patterns, determining a transmission beam pattern and a reception beam pattern for an access point (AP) based on channel measurement feedback information received from the AP and the self-interference strength table, and performing a communication operation with the AP based on the determined transmission beam pattern and reception beam pattern.

An embodiment of the present disclosure proposes an access point (AP) for operating a full-duplex scheme in a communication system supporting a beamforming scheme, and the AP comprises a processor to generate a self-interference strength table according to transmission beam patterns and reception beam patterns, to determine a transmission beam pattern and a reception beam pattern for each of stations (STAs) based on channel measurement feedback information received from the STAs to which the AP provides a service and the self-interference strength table, and to perform a communication operation with each of the STAs based on the determined transmission beam pattern and reception beam pattern.

An embodiment of the present disclosure proposes a station (STA) for operating a full-duplex scheme in a communication system supporting a beamforming scheme, and the STA comprises a processor to generate a self-interference strength table according to transmission beam patterns and reception beam patterns, to determine a transmission beam pattern and a reception beam pattern for an access point (AP) based on channel measurement feedback information received from the AP and the self-interference strength table, and to perform a communication operation with the AP based on the determined transmission beam pattern and reception beam pattern.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIG. 14 schematically illustrates a frame structure and signaling for operating a full-duplex scheme in a communication system supporting a beamforming scheme according to an embodiment of the present disclosure;

Throughout the drawings, it should be noted that like reference numbers are used to depict the same or similar elements, features, and structures.

DETAILED DESCRIPTION

Figure 1:
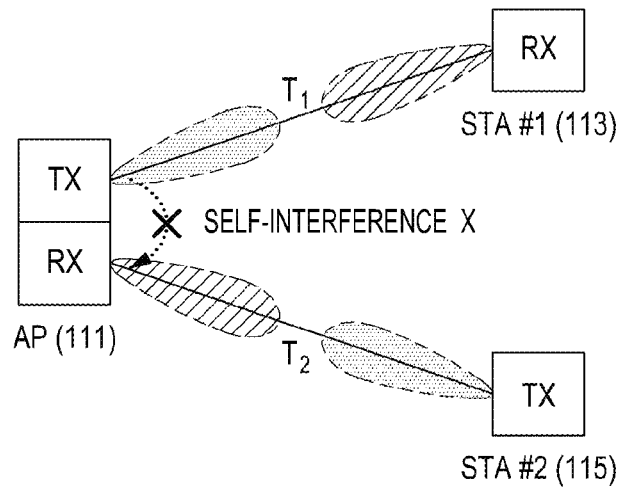
FIG. 1 schematically illustrates a structure of a communication system supporting a general half-duplex scheme.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MM) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal transmitting apparatus may be, for example, an access point (AP).

According to various embodiments of the present disclosure, a signal receiving apparatus may be, for example, a station (STA).

An embodiment of the present disclosure proposes an apparatus and method for operating a full-duplex scheme in a communication system supporting a beamforming scheme.

An embodiment of the present disclosure proposes an apparatus and method for operating a full-duplex scheme by considering self-interference strength in a communication system supporting a beamforming scheme.

An embodiment of the present disclosure proposes an apparatus and method for operating a full-duplex scheme by considering a direction-of-arrival (DoA) in a communication system supporting a beamforming scheme.

An embodiment of the present disclosure proposes an apparatus and method for operating a full-duplex scheme based on a beam selection/nulling scheme in a communication system supporting a beamforming scheme.

An embodiment of the present disclosure proposes an apparatus and method for operating a full-duplex scheme by considering a channel rank in a communication system supporting a beamforming scheme.

An embodiment of the present disclosure proposes an apparatus and method for operating a full-duplex scheme by considering fading correlation in a communication system supporting a beamforming scheme.

An apparatus and method proposed in an embodiment of the present disclosure may be applied to various communication systems such as an institute of electrical and electronics engineers (IEEE) 802.11ac communication system, an IEEE 802.16 communication system, a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, and/or the like, and an internet protocol television (IPTV) service, and/or the like, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, a mobile internet protocol (Mobile IP) system, and/or the like.

Hereinafter, an embodiment of the present disclosure considers all of a pair-wise full-duplex system including an AP supporting a full-duplex scheme and STAs, and a unrestricted full-duplex system including an AP supporting a full-duplex scheme and STAs supporting a half-duplex scheme. An embodiment of the present disclosure considers full-duplex system including an AP, a plurality of receiving STAs, and a plurality of transmitting STAs supporting a full-duplex scheme.

A structure of a communication system supporting a general half-duplex scheme will be described with reference to FIG. 1.

FIG. 1 schematically illustrates a structure of a communication system supporting a general half-duplex scheme.

Referring to FIG. 1, the communication system includes an AP 111 and a plurality of STAs, e.g., an STA #1 113 and an STA #2 115.

Orthogonal resources are used in a link between the AP 111 and the STA #1 113 and a link between the AP 111 and the STA #2 115, and a transmission/reception antenna weight vector for each of the link between the AP 111 and the STA #1 113 and the link between the AP 111 and the STA #2 115 is independently determined. So, there is no self-interference effect between the link between the AP 111 and the STA #1 113 and the link between the AP 111 and the STA #2 115.

A structure of a communication system supporting a general half-duplex scheme has been described with reference to FIG. 1, and a structure of a communication system supporting a general full-duplex scheme will be described with reference to FIG. 2.

Figure 2:
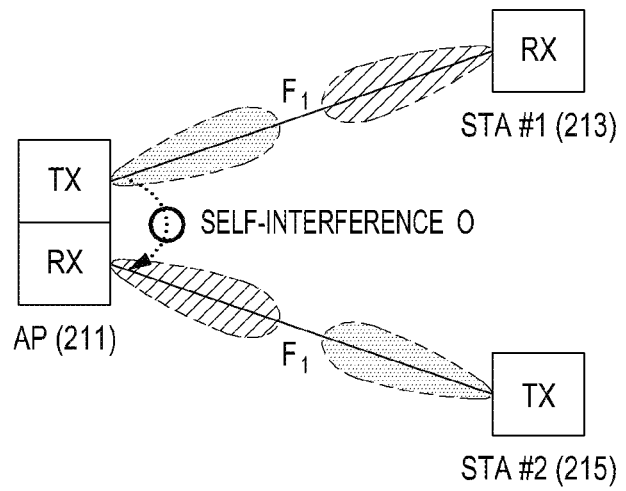
FIG. 2 schematically illustrates a structure of a communication system supporting a general full-duplex scheme.

FIG. 2 schematically illustrates a structure of a communication system supporting a general full-duplex scheme.

Referring to FIG. 2, the communication system includes an AP 211 and a plurality of STAs, e.g., an STA #1 213 and an STA #2 215.

The same resource is used in a link between the AP 211 and the STA #1 213 and a link between the AP 211 and the STA #2 215. Here, the same resource denotes a resource which is occupied by the same frequency and the same time. Since the link between the AP 211 and the STA #1 213 and the link between the AP 211 and the STA #2 215 use the same resource, there is self-interference effect between the link between the AP 211 and the STA #1 213 and the link between the AP 211 and the STA #2 215. So, if an antenna weight vector is independently determined in the link between the AP 211 and the STA #1 213 and the link between the AP 211 and the STA #2 215, self-interference which is out of an analog to digital convertor (ADC) dynamic range occurs.

So, an analog interference cancellation scheme using an additional antenna separation or analog circuit has been used for preventing this self-interference from occurring.

However, an embodiment of the present disclosure proposes a transmission/reception beam selection/nulling scheme which considers self-interference, especially self-interference strength and self-interference DoA in an environment where self-interference occurs to enable to operate a full-duplex scheme without decreasing complexity of an analog circuit for self-interference cancellation or using an additional analog circuit.

An example of a process for determining a transmission/reception beam pattern for operating a full-duplex scheme in a communication system supporting a beamforming scheme according to an embodiment of the present disclosure will be described with reference to FIG. 3.

Figure 3:
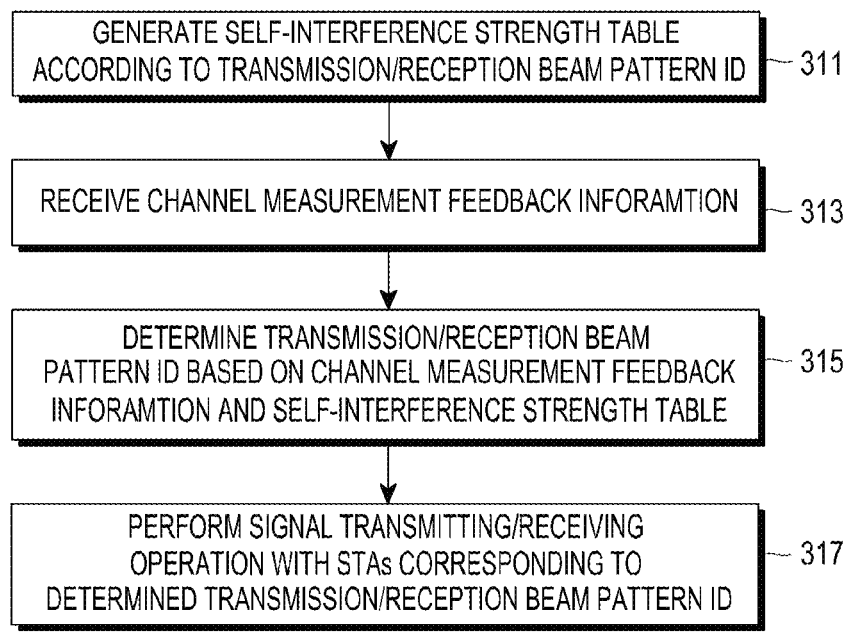
FIG. 3 schematically illustrates an example of a process for determining a transmission/reception beam pattern for operating a full-duplex scheme in a communication system supporting a beamforming scheme according to an embodiment of the present disclosure.

FIG. 3 schematically illustrates an example of a process for determining a transmission/reception beam pattern for operating a full-duplex scheme in a communication system supporting a beamforming scheme according to an embodiment of the present disclosure.

Referring to FIG. 3, it will be noted that a transmission/reception beam pattern determining process in FIG. 3 is an example of a transmission/reception beam pattern determining process considering self-interference strength.

An AP generates a self-interference strength table according to a transmission/reception beam pattern identifier (ID) at operation 311, and proceeds to operation 313. The AP receives, from each of STAs to which the AP provides a service, a transmission beam pattern ID, i.e., a preferred transmission beam pattern ID, which each of the STAs prefers for the AP and channel measurement feedback information including channel quality information, for example, a signal-to-noise ratio (SNR), a signal-to-interference noise ratio (SINR), received signal code power (RSCP), reference signal received power (RSRP), a reference signal strength indicator (RSSI), reference signal received quality (RSRQ), a carrier-to-interference noise ratio (CINR), a block error rate (BLER), and/or the like, at operation 313, and proceeds to operation 315. For convenience, in an embodiment of the present disclosure, it will be assumed that the channel quality information includes an SNR and an SINR.

The AP determines a transmission/reception beam pattern ID for each of the STAs based on the channel measurement feedback information received from each of the STAs and the generated self-interference strength table at operation 315, and proceeds to operation 317. The AP performs a signal transmitting/receiving operation with the STAs using a transmission/reception beam pattern which corresponds to the transmission/reception beam pattern ID determined for each of the STAs at operation 317.

Meanwhile, a transmission/reception beam pattern may be set such that it is possible to fully cover a specific spherical sector, or may be set by feeding back at least one of a preferred transmission beam pattern ID and channel quality information to an AP in each STA. Here, the transmission/reception beam pattern ID may be determined after a sector-level training process, i.e., a sector level sweep (SLS) process or may be determined in a beam-level training process, i.e., a beam refinement protocol (BRP) process. A detailed description of the SLS process and the BRP process will be omitted herein.

Meanwhile, a process for determining a transmission/reception beam pattern as described in FIG. 3 may be performed using an orthogonal resource.

An example of a process for determining a transmission/reception beam pattern for operating a full-duplex scheme in a communication system supporting a beamforming scheme according to an embodiment of the present disclosure has been described with reference to FIG. 3, and a process of generating a self-interference strength table in a communication system supporting a beamforming scheme according to an embodiment of the present disclosure will be described with reference to FIG. 4.

Figure 4:
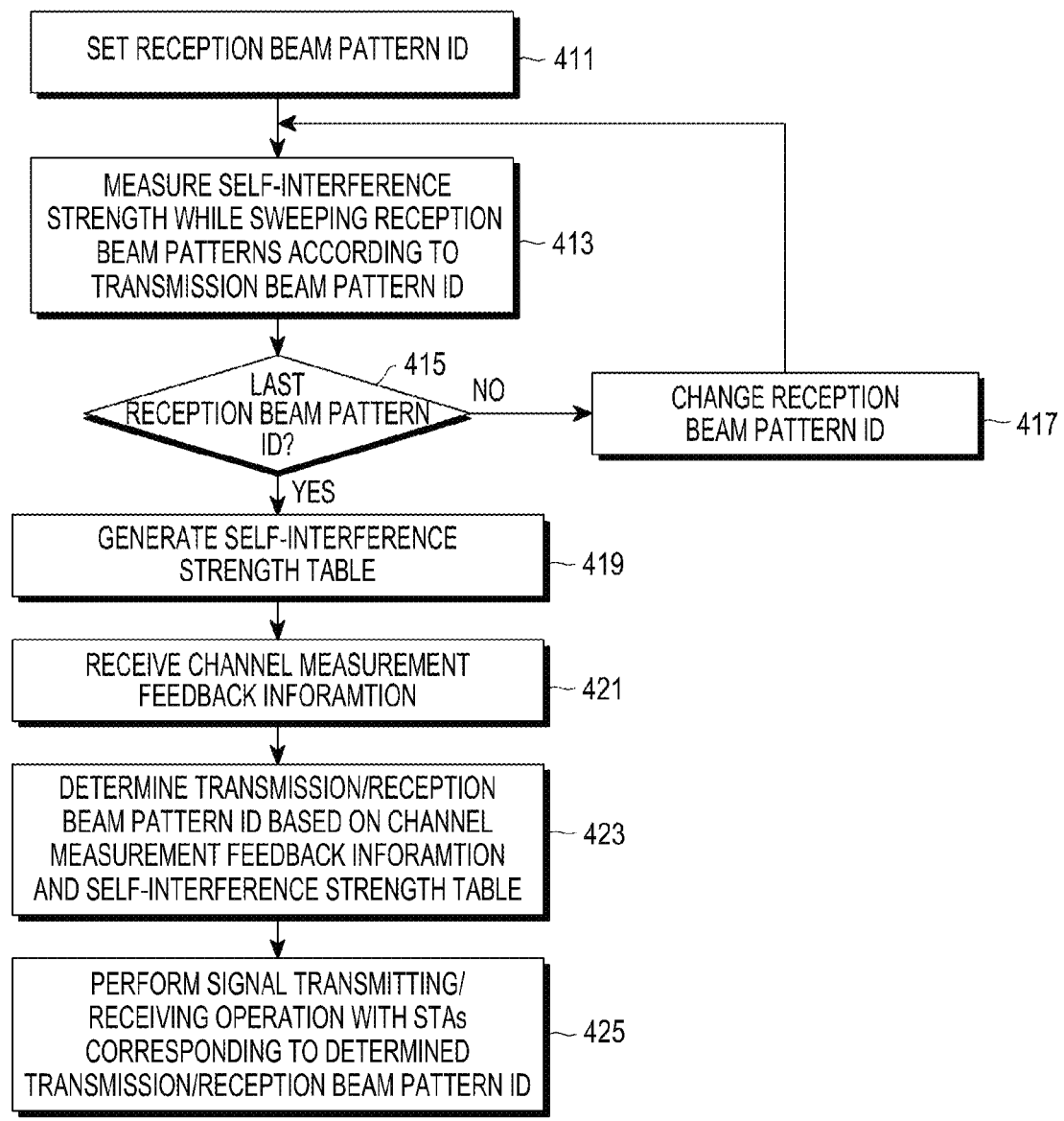
FIG. 4 schematically illustrates a process of generating a self-interference strength table in a communication system supporting a beamforming scheme according to an embodiment of the present disclosure.

FIG. 4 schematically illustrates a process of generating a self-interference strength table in a communication system supporting a beamforming scheme according to an embodiment of the present disclosure.

Referring to FIG. 4, an AP sets a reception beam pattern ID at operation 411, and proceeds to operation 413. The AP measures self-interference strength while sweeping transmission beam patterns according to a transmission beam pattern ID at operation 413, and proceeds to operation 415. The AP determines whether the set reception beam pattern ID is the last reception beam pattern ID at operation 415. If the set reception beam pattern ID is not the last reception beam pattern ID, the AP proceeds to operation 417. The AP changes the reception beam pattern ID at operation 417, and proceeds to operation 413.

If the set reception beam pattern ID is the last reception beam pattern ID according to the determined result at operation 415, the AP proceeds to operation 419. The AP generates a self-interference strength table at operation 419, and proceeds to operation 421. That is, the AP measures self-interference strength while sweeping transmission beam patterns corresponding to all transmission beam pattern IDs which the AP may support based on a specific order for each of all reception beam pattern IDs which the AP may support, and generates a self-interference strength table based on the measured self-interference strength after self-interference strength measurement for all reception beam pattern IDs is completed. Here, the self-interference strength table may be implemented with various forms. For example, the self-interference strength table may be generated with a form that all of the transmission beam pattern IDs are mapped to each of all of the reception beam pattern IDs and self-interference strength according to one-to-one mapping between a corresponding reception beam pattern ID and a corresponding transmission beam pattern ID is stored.

Meanwhile, the AP receives channel measurement feedback information from each STA at operation 421, and proceeds to operation 423. The AP determines a transmission/reception beam pattern ID for each STA based on the channel measurement feedback information, i.e., a preferred transmission beam pattern ID, channel quality information, i.e., SNR and SINR information, and the generated self-interference strength table at operation 423, and proceeds to operation 425. The STA performs a signal transmitting operation and a signal receiving operation using a transmission/reception beam pattern which corresponds to the transmission/reception beam pattern ID determined for each STA at operation 425.

A case that the AP generates a self-interference strength table while sweeping transmission beam patterns according to transmission beam pattern IDs based on a reception beam pattern ID has been described in FIG. 4, however, the AP may generate a self-interference strength table while sweeping reception beam patterns according to reception beam pattern IDs based on a transmission beam pattern ID.

Further, a self-interference strength table as described in FIG. 4 is generated, for example, at a timing at which the AP is deployed, and then may be updated in an SLS process, a BRP process, or a separate interval by considering channel environment change, and/or the like. Here, it will be noted that the timing at which the self-interference strength table is generated and the timing at which the self-interference strength table is updated are not limited.

A process of generating a self-interference strength table in a communication system supporting a beamforming scheme according to an embodiment of the present disclosure has been described with reference to FIG. 4, and a process for applying a transmission/reception beam pattern determining process which is based on self-interference to a multiuse full-duplex multiple input multiple output (MIMO) system in a communication system supporting a beamforming scheme according to an embodiment of the present disclosure will be described with reference to FIG. 5.

Figure 5:
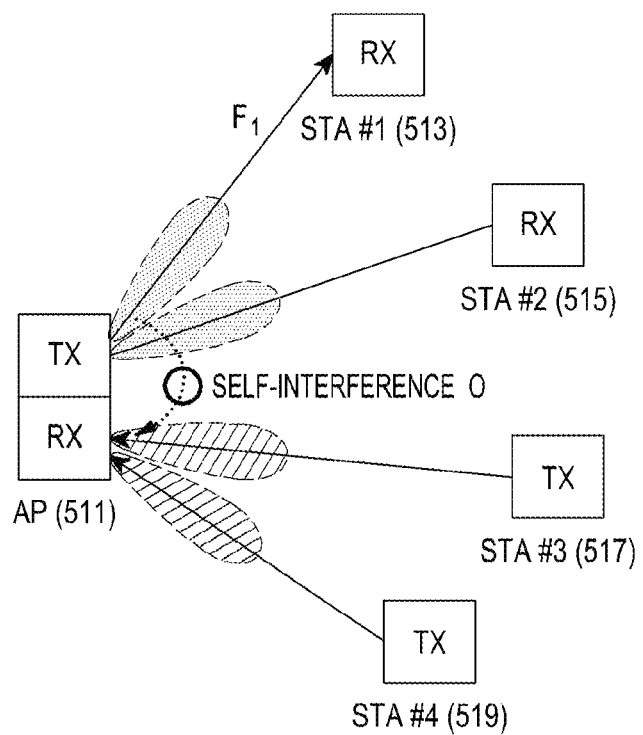
FIG. 5 schematically illustrates a process for applying a transmission/reception beam pattern determining process which is based on self-interference to a multiuse full-duplex MIMO system in a communication system supporting a beamforming scheme according to an embodiment of the present disclosure.

FIG. 5 schematically illustrates a process for applying a transmission/reception beam pattern determining process which is based on self-interference to a multiuse full-duplex MIMO system in a communication system supporting a beamforming scheme according to an embodiment of the present disclosure.

Referring to FIG. 5, the communication system includes an AP 511, and a plurality of STAs, i.e., an STA #1 513, an STA #2 515, an STA #3 517, and an STA #4 519.

In an existing scheme which allocates a downlink beamforming pattern and uplink transmission power, and independently considers self-interference and beamforming such that a data rate of a downlink and a uplink is maximized, there is a need for a selective interference cancellation (SIC) scheme such as an analog circuit, and/or the like for maintaining low self-interference which is enough to acquire a full-duplex gain, that is, for maintaining self-interference which is less than or equal to threshold strength in which a full-duplex gain may be acquired.

An embodiment of the present disclosure may acquire a full-duplex gain without a separate analog circuit by regarding a transmission beam, or a transmission beam or a uplink STA and a downlink STA as self-interference and selecting a beam. In an embodiment of the present disclosure, a multi-user diversity gain may be also acquired in an environment where self-interference occurs in a communication system supporting a full-duplex scheme. In this case, a self-interference strength table may be generated based on a beam book, and the self-interference strength table needs to be generated by considering a combination of transmission/reception beam patterns unlike a case that only a single user is considered.

A process for applying a transmission/reception beam pattern determining process which is based on self-interference to a multiuse full-duplex MIMO system in a communication system supporting a beamforming scheme according to an embodiment of the present disclosure has been described with reference to FIG. 5, and another example of a process for determining a transmission/reception beam pattern for operating a full-duplex scheme in a communication system supporting a beamforming scheme according to an embodiment of the present disclosure will be described with reference to FIG. 6.

Figure 6:
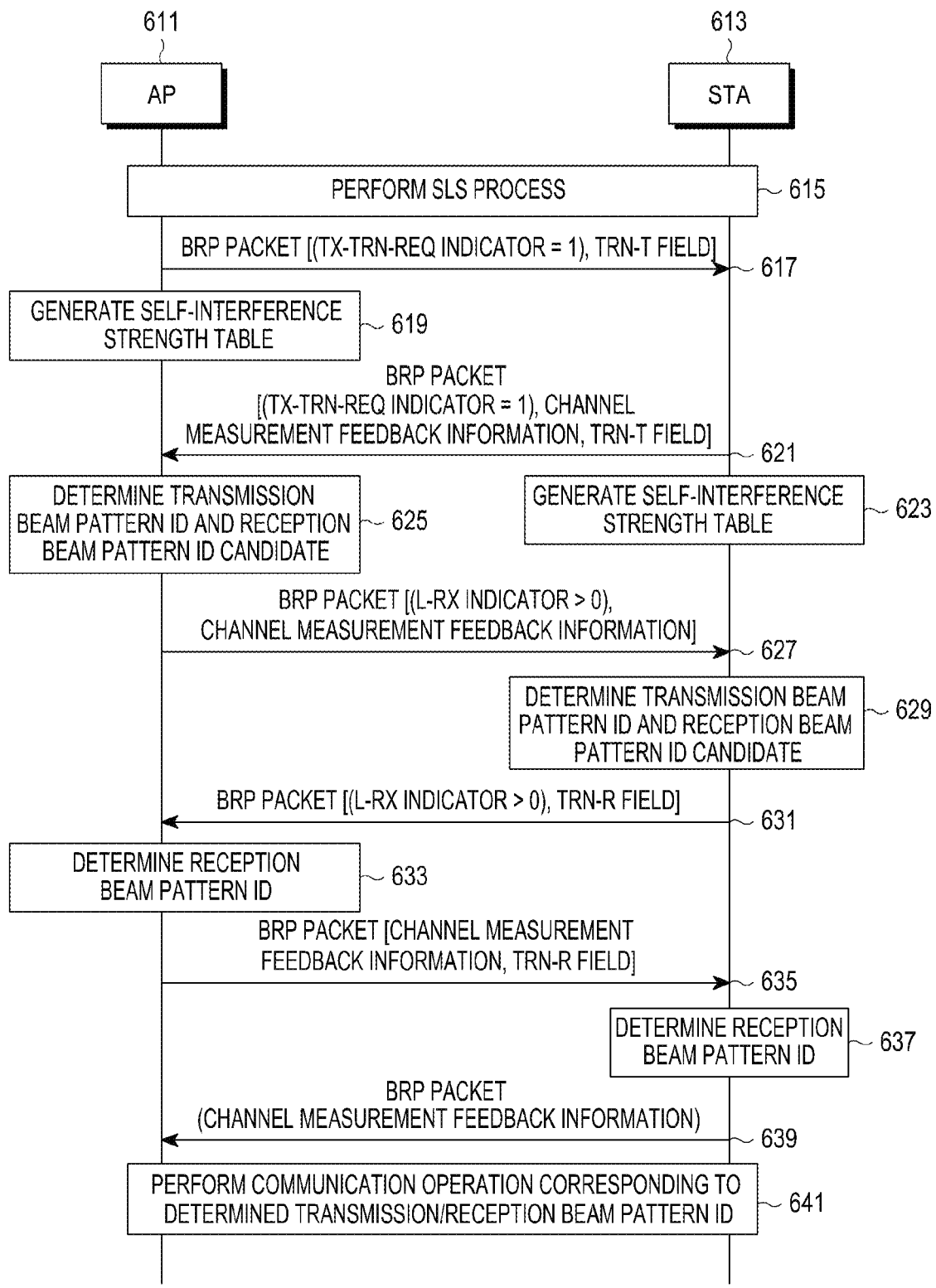
FIG. 6 schematically illustrates another example of a process for determining a transmission/reception beam pattern for operating a full-duplex scheme in a communication system supporting a beamforming scheme according to an embodiment of the present disclosure.

FIG. 6 schematically illustrates another example of a process for determining a transmission/reception beam pattern for operating a full-duplex scheme in a communication system supporting a beamforming scheme according to an embodiment of the present disclosure.

Referring to FIG. 6, it will be noted that a transmission/reception beam pattern determining process in FIG. 6 is a transmission/reception beam pattern determining process of determining a reception beam pattern ID after determining a transmission beam pattern ID based on self-interference strength in a pair-wise full-duplex environment. The communication system includes an AP 611 and an STA 613.

Firstly, an SLS process is performed between the AP 611 and the STA 613 (at operation 615). Then, a BRP process is performed between the AP 611 and the STA 613, and a transmission beam pattern and a reception beam pattern are finally determined. The BRP process performed between the AP 611 and the STA 613 will be described below.

The AP 611 transmits a BRP packet to the STA 613 (at operation 617). The BRP packet includes a transmit-training request (TX-TRN-REQ) indicator, and the TX-TRN-REQ indicator is an indicator indicating that a transmit-training is requested. The TX-TRN-REQ indicator may be implemented with, for example, 1 bit, and if a value of the TX-TRN-REQ indicator is, for example, '1', it means that the transmit-training is requested. That is, if the value of the TX-TRN-REQ indicator is 1, it means that the AP 611 requests a transmit-training from the STA 613. The BRP packet includes a transmit-training (TRN-T) field. The AP 611 generates a self-interference strength table after transmitting the BRP packet (at operation 619). If the self-interference strength table was generated already, the AP 611 does not generate the self-interference strength table and updates the self-interference strength table which was generated already.

After receiving the BRP packet from the AP 611, the STA 613 generates channel measurement feedback information, i.e., channel measurement feedback information including a transmission beam pattern ID which the STA 613 prefers for the AP 611 and channel quality information, e.g., an SNR based on the BRP packet. The STA 613 transmits a BRP packet including the channel measurement feedback information, a TX-TRN-REQ indicator of which a value is set to 1, and a TRN-T field to the AP 611 (at operation 621).

The STA 613 generates a self-interference strength table after transmitting the BRP packet (at operation 623). If the self-interference strength table was generated already, the STA 613 does not generate the self-interference strength table and updates the self-interference strength table which was generated already.

After receiving the BRP packet from STA 613, the AP 611 determines a transmission beam pattern ID to be applied to the STA 613 based on the channel measurement feedback information included in the BRP packet and the self-interference strength table, and determines a reception beam pattern ID candidate based on the selected transmission beam pattern ID (at operation 625). In a case of determining the reception beam pattern ID candidate based on the determined transmission beam pattern ID and the self-interference strength table, the number of refinement reception beam pattern IDs used for determining a reception beam pattern ID in a BRP process may be decreased.

The AP 611 includes channel measurement feedback information which is generated based on the determined transmission beam pattern ID into the next BRP packet to transmit the next BRP packet to the STA 613 (at operation 627). The BRP packet includes an L-RX indicator indicating the number of receive-training (TRN-R) fields. Here, a value of the L-RX indicator is set to a value greater than zero (0). After receiving the BRP packet from the AP 611, the STA 613 determines a transmission beam pattern ID to be applied to the AP 611 based on the channel measurement feedback information included in the BRP packet and the self-interference strength table, and determines a reception beam pattern ID candidate based on the determined transmission beam pattern ID (at operation 629). In a case of determining the reception beam pattern ID candidate based on the selected transmission beam pattern ID and the self-interference strength table, the number of reception beam pattern IDs used for determining a reception beam pattern ID in a BRP process may be decreased. The STA 613 transmits a BRP packet using the determined transmission beam pattern ID (at operation 631). The BRP packet includes an L-RX indicator, and a value of the L-RX indicator is set to a value greater than zero (0). The BRP packet includes a TRN-R field.

The AP 611 receives the BRP packet from the STA 613 based on the determined reception beam pattern ID candidate, and determines a reception beam pattern ID based on a received result for the TRN-R field (at operation 633). The AP 611 transmits a BRP packet to the STA 613 (operation 635). The BRP packet includes channel measurement feedback information which is generated based on the self-interference strength table, and the determined transmission beam pattern ID and reception beam pattern ID. The channel quality information included in the channel measurement feedback information includes an SINR. The BRP packet includes a TNR-R field.

The STA 613 receives a BRP packet from the AP 611 based on the determined reception beam pattern ID candidate, and determines a reception beam pattern ID based on a received result for the TRN-R field included in the BRP packet (at operation 637). The STA 613 generates channel measurement feedback information based on the self-interference strength table, and the determined transmission beam pattern ID and reception beam pattern ID, and transmits a BRP packet including the channel measurement feedback information to the AP 611 (at operation 639). Here, channel quality information included in the channel measurement feedback information includes an SINR.

Each of the AP 611 and the STA 613 performs a link adaptation operation based on channel measurement feedback information, and performs a communication operation each other using the determined transmission beam pattern ID and reception beam pattern ID (at operation 641). The link adaptation operation is an operation of adaptively determining a modulation scheme and a code rate based on the channel quality information included in the channel measurement feedback information, and a detailed description of the link adaptation operation will be omitted herein.

Another example of a process for determining a transmission/reception beam pattern for operating a full-duplex scheme in a communication system supporting a beamforming scheme according to an embodiment of the present disclosure has been described with reference to FIG. 6, and still another example of a process for determining a transmission/reception beam pattern for operating a full-duplex scheme in a communication system supporting a beamforming scheme according to an embodiment of the present disclosure will be described with reference to FIG. 7.

Figure 7:
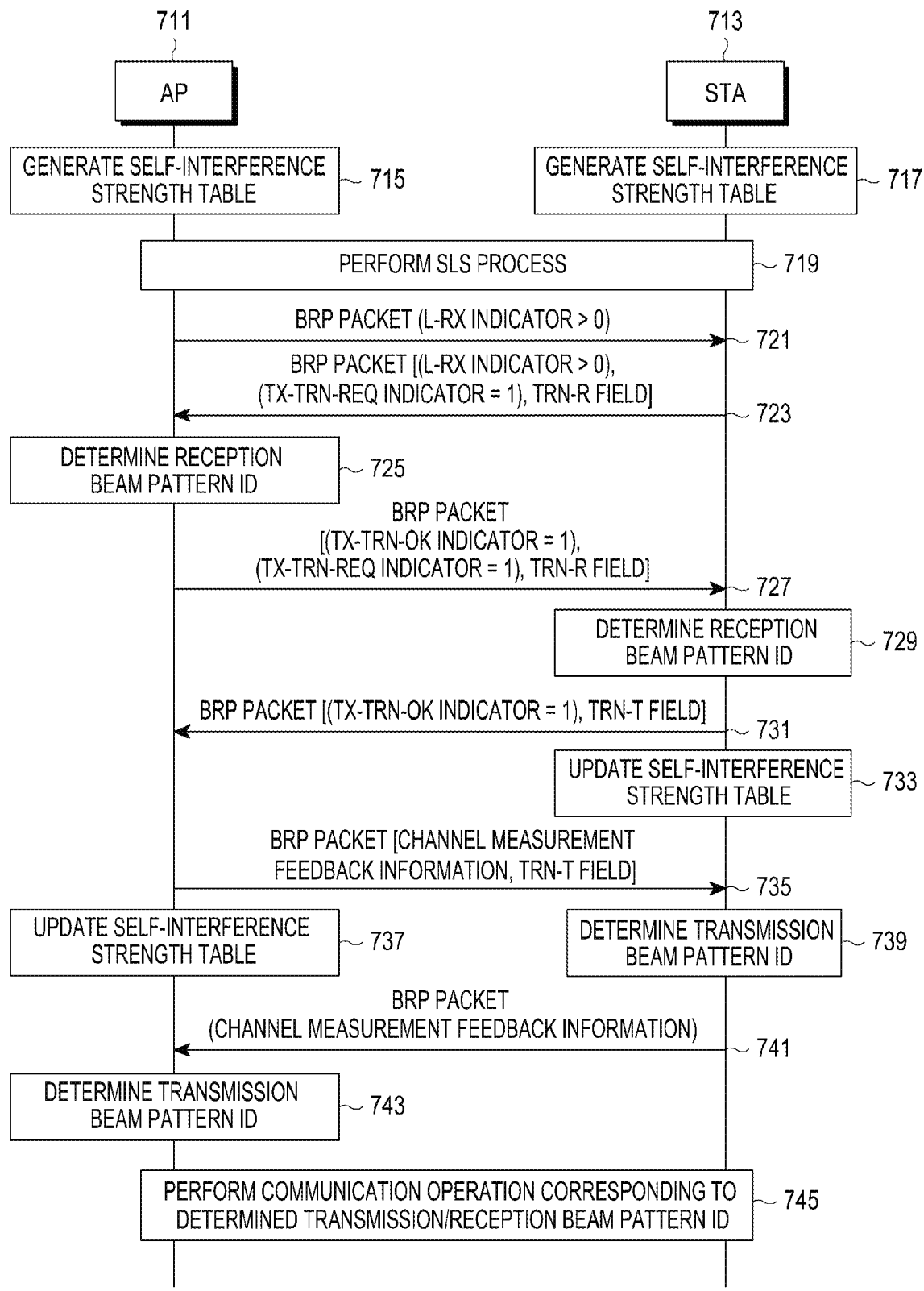
FIG. 7 schematically illustrates still another example of a process for determining a transmission/reception beam pattern for operating a full-duplex scheme in a communication system supporting a beamforming scheme according to an embodiment of the present disclosure.

FIG. 7 schematically illustrates still another example of a process for determining a transmission/reception beam pattern for operating a full-duplex scheme in a communication system supporting a beamforming scheme according to an embodiment of the present disclosure.

Referring to FIG. 7, it will be noted that a transmission/reception beam pattern determining process in FIG. 7 is a transmission/reception beam pattern determining process of determining a transmission beam pattern ID after determining a reception beam pattern ID based on self-interference strength in a pair-wise full-duplex environment. The communication system includes an AP 711 and an STA 713.

Each of the AP 711 and the STA 713 generates a self-interference strength table (at operations 715 and 717). A scheme of generating the self-interference strength table may be the same as described above, and a detailed description thereof will be omitted herein. Then, an SLS process is performed between the AP 711 and the STA 713 (at operation 719). The SLS process performed between the AP 711 and the STA 713 is identical to a general SLS process, and a detailed description thereof will be omitted herein.

The AP 711 transmits a BRP packet including an L-RX indicator to the STA 713 (at operation 721). Here, a value of the L-RX indicator is set to a value greater than zero (0). After receiving the BRP packet including the L-RX indicator from the AP 711, the STA 713 transmits a BRP packet including an L-RX indicator, a TX-TRN-REQ indicator, and a TRN-R field to the AP 711 (at operation 723). Here, a value of the L-RX indicator is set to a value greater than zero (0), and a value of the TX-TRN-REQ indicator is set to 1. The STA 713 requests all of receive-training and transmit-training from the AP 711 by transmitting the BRP packet including the L-RX indicator, the TX-TRN-REQ indicator, and the TRN-R field.

The AP 711 determines a reception beam pattern ID using the TRN-R field received from the STA 713 (at operation 725), and transmits a BRP packet to the STA 713 in response to a receive-training request of the STA 713 (at operation 727). Here, the BRP packet includes a TX-TRN-OK indicator, a TX-TRN-REQ indicator, and a TRN-R field. Here, the TX-TRN-OK indicator is an indicator indicating confirmation of training previously requested. That is, the TX-TRN-OK indicator is an indicator indicating a response to the TX-TRN-REQ indicator, and may be implemented with, for example, 1 bit. If a value of the TX-TRN-OK indicator is set to, for example, 1, it means that the TRN-R field is transmitted corresponding to a corresponding a TX-TRN-REQ indicator. Further, a value of each of the TX-TRN-OK indicator and the TX-TRN-REQ indicator is set to 1.

The STA 713 determines a reception beam pattern ID using the BRP packet transmitted by the AP 713 (at operation 729), and transmits the next BRP packet to the AP 713 in response to the transmit-training request from the AP 713 (at operation 731). Here, the BRP packet includes a TX-TRN-OK indicator, and a value of the TX-TRN-OK indicator is set to, for example, 1. The BRP packet includes a TRN-T field. After transmitting the BRP packet to the AP 713, the STA 713 updates the self-interference strength table (at operation 733). Since the STA 713 generated the self-interference strength table already, the STA 713 updates the self-interference strength table. If the self-interference strength table is not generated, the STA 713 may generate the self-interference strength table.

Meanwhile, the AP 711 receives the BRP packet including the TRN-T field from the STA 713 based on the determined reception beam pattern ID, generates channel measurement feedback information based on the TRN-T field included in the received BRP packet, and includes the channel measurement feedback information into the next BRP packet to transmit the next BRP packet to the STA 713 (at operation 735). The BRP packet includes also a TRN-T field. After transmitting the BRP packet to the STA 713, the AP 711 updates the self-interference strength table (at operation 737). Since the AP 711 generated the self-interference strength table already, the AP 711 updates the self-interference strength table. If the self-interference strength table is not generated, the AP 711 may generate the self-interference strength table.

Meanwhile, the STA 713 receives the BRP packet including the channel measurement feedback information and the TRN-T field from the AP 711 using the determined reception beam pattern ID, generates channel measurement feedback information using the TRN-T field, and determines a transmission beam pattern ID based on the channel measurement feedback information and the updated self-interference strength table (at operation 739). The STA 713 may detect signal power through the TRN-T field, and may detect interference power based on the updated self-interference strength table. That is, after fixing a reception beam pattern ID as the determined reception beam pattern ID in a BRP interval during which the AP 711 transmits transmit-training through the TRN-T field, the STA 713 estimates signal power, and estimates self-interference strength when the STA 711 transmits transmit-training.

The STA 711 transmits, to the AP 711, a BRP packet including channel measurement feedback information using the determined transmission beam pattern ID (at operation 741). The AP 711 receives a BPR packet from the STA 711 using the determined reception beam pattern ID, and determines a transmission beam pattern ID based on the channel measurement feedback information included in the BRP packet and the updated self-interference strength table (at operation 743).

Each of the AP 711 and the STA 713 performs a link adaptation operation based on channel measurement feedback information, and performs a communication operation each other using the determined transmission beam pattern ID and reception beam pattern ID (at operation 745). The link adaptation operation is an operation of adaptively determining a modulation scheme and a code rate based on the channel measurement feedback information, and a detailed description of the link adaptation operation will be omitted herein.

Still another example of a process for determining a transmission/reception beam pattern for operating a full-duplex scheme in a communication system supporting a beamforming scheme according to an embodiment of the present disclosure has been described with reference to FIG. 7, and still another example of a process for determining a transmission/reception beam pattern for operating a full-duplex scheme in a communication system supporting a beamforming scheme according to an embodiment of the present disclosure will be described with reference to FIG. 8.

Figure 8:
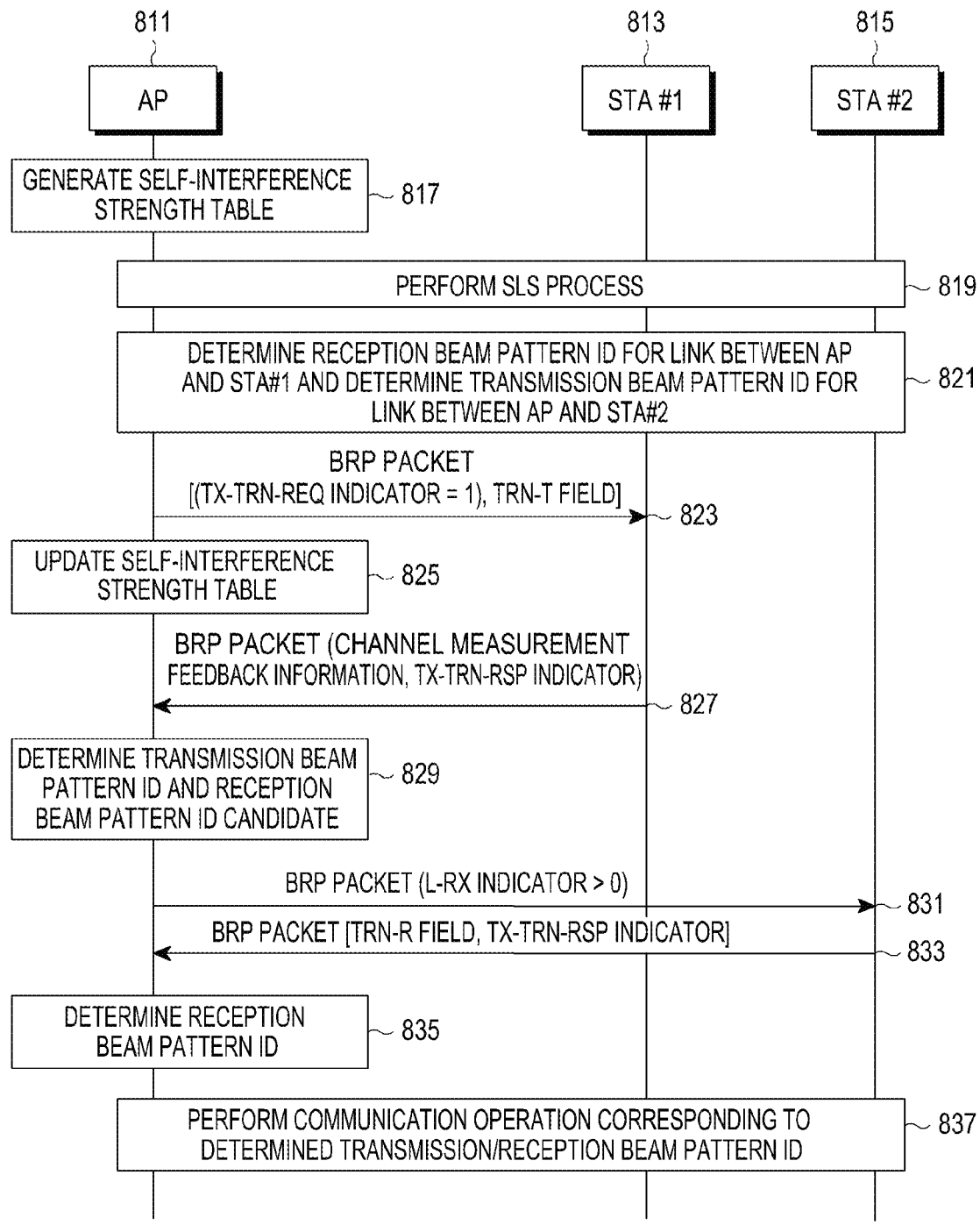
FIG. 8 schematically illustrates still another example of a process for determining a transmission/reception beam pattern for operating a full-duplex scheme in a communication system supporting a beamforming scheme according to an embodiment of the present disclosure.

FIG. 8 schematically illustrates still another example of a process for determining a transmission/reception beam pattern for operating a full-duplex scheme in a communication system supporting a beamforming scheme according to an embodiment of the present disclosure.

Referring to FIG. 8, it will be noted that a transmission/reception beam pattern determining process in FIG. 8 is a transmission/reception beam pattern determining process of determining a reception beam pattern ID after determining a transmission beam pattern ID based on self-interference strength in an AP in a unlimited full-duplex environment. The communication system includes an AP 811, an STA #1 813, and an STA #2 815. Here, the AP 811 firstly determines a transmission beam pattern ID for the STA #1 813, and determines a reception beam pattern ID for the STA #2 815 after determining the transmission beam pattern ID for the STA #1 813.

The AP 811 generates a self-interference strength table (at operation 817). A scheme of generating the self-interference strength table may be the same as described above, and a detailed description thereof will be omitted herein. Then, an SLS process is performed among the AP 811, the STA #1 813, and the STA #2 815 (at operation 819). The SLS process performed among the AP 811, the STA #1 813, and the STA #2 815 is identical to a general SLS process, and a detailed description thereof will be omitted herein.

Then, a reception beam pattern ID of an STA #1 for a link between the AP 811 and the STA #1 813 is determined, and a transmission beam pattern ID of the STA #2815 for a link between the AP 811 and the STA #2 815 is determined through a BRP process among the AP 811, the STA #1 813, and the STA #2 815 (at operation 821). The BRP process in which the reception beam pattern ID of the link between the AP 811 and the STA #1 813 and the transmission beam pattern ID of the link between the AP 811 and the STA #2 815 are selected is identical to a general BRP process, and a detailed description thereof will be omitted herein.

After the reception beam pattern ID for the link between the AP 811 and the STA #1 813 is determined, and the transmission beam pattern ID of the link between the AP 811 and the STA #2 815 is determined, the AP 811 transmits a BRP packet including a TX-TRN-REQ indicator and a TRN-T field to the STA #1 813 (at operation 823). Here, a value of the TX-TRN-REQ indicator is set to 1. After transmitting the BRP packet to the STA #1 813, the AP 811 updates a self-interference strength table (at operation 825). Since the AP 811 generated the self-interference strength table already, the AP 811 updates the self-interference strength table. If the self-interference strength table is not generated, the AP 811 may generate the self-interference strength table.

Meanwhile, the STA #1 813 receives the BRP packet including the TRN-T field from the AP 811, and generates channel measurement feedback information through the TRN-T field. The STA #1 813 includes the channel measurement feedback information into the next BRP packet to transmit the next BRP packet to the AP 811 (at operation 827). Here, the BRP packet includes a TX-TRAIN-RESPONSE indicator indicating a response to a transmit-training request.

The AP 811 receives the BRP packet transmitted by the STA #1 813, determines a transmission beam pattern ID for the STA #1 813 based on the channel measurement feedback information included in the BRP packet and the updated self-interference strength table, and determines a reception beam pattern ID candidate for the STA #2 815 (at operation 829).

The AP 811 transmits, to the STA #2 815, a BRP packet including an L-RX indicator using the determined transmission beam pattern ID for the STA #2 815 for requesting receive-training (at operation 831). Here, a value of the L-RX indicator is set to a value greater than zero (0). After receiving the BRP packet from the AP 811, the STA #2 815 includes a RX-TRAIN-RESPONSE indicator into the next BRP packet to transmit the next BRP packet to the AP 811

(at operation 833). Here, the RX-TRAIN-RESPONSE indicator denotes a response to receive-training request. The BRP packet also includes a TRN-R field.

The AP 811 receives the BRP packet including the TRN-R field from the STA #2 815, generates channel measurement feedback information using the received TRN-R field, and determines a reception beam pattern ID for the STA #2 815 based on the updated self-interference strength table and the channel measurement feedback information (at operation 835).

Each of the AP 811, the STA #1 813, and the STA #2 815 performs a link adaptation operation based on channel measurement feedback information, and performs a communication operation one another using the determined transmission beam pattern ID and reception beam pattern ID (at operation 837). The link adaptation operation is an operation of adaptively determining a modulation scheme and a code rate based on the channel measurement feedback information, and a detailed description of the link adaptation operation will be omitted herein.

Still another example of a process for determining a transmission/reception beam pattern for operating a full-duplex scheme in a communication system supporting a beamforming scheme according to an embodiment of the present disclosure has been described with reference to FIG. 8, and still another example of a process for determining a transmission/reception beam pattern for operating a full-duplex scheme in a communication system supporting a beamforming scheme according to an embodiment of the present disclosure will be described with reference to FIG. 9.

Figure 9:
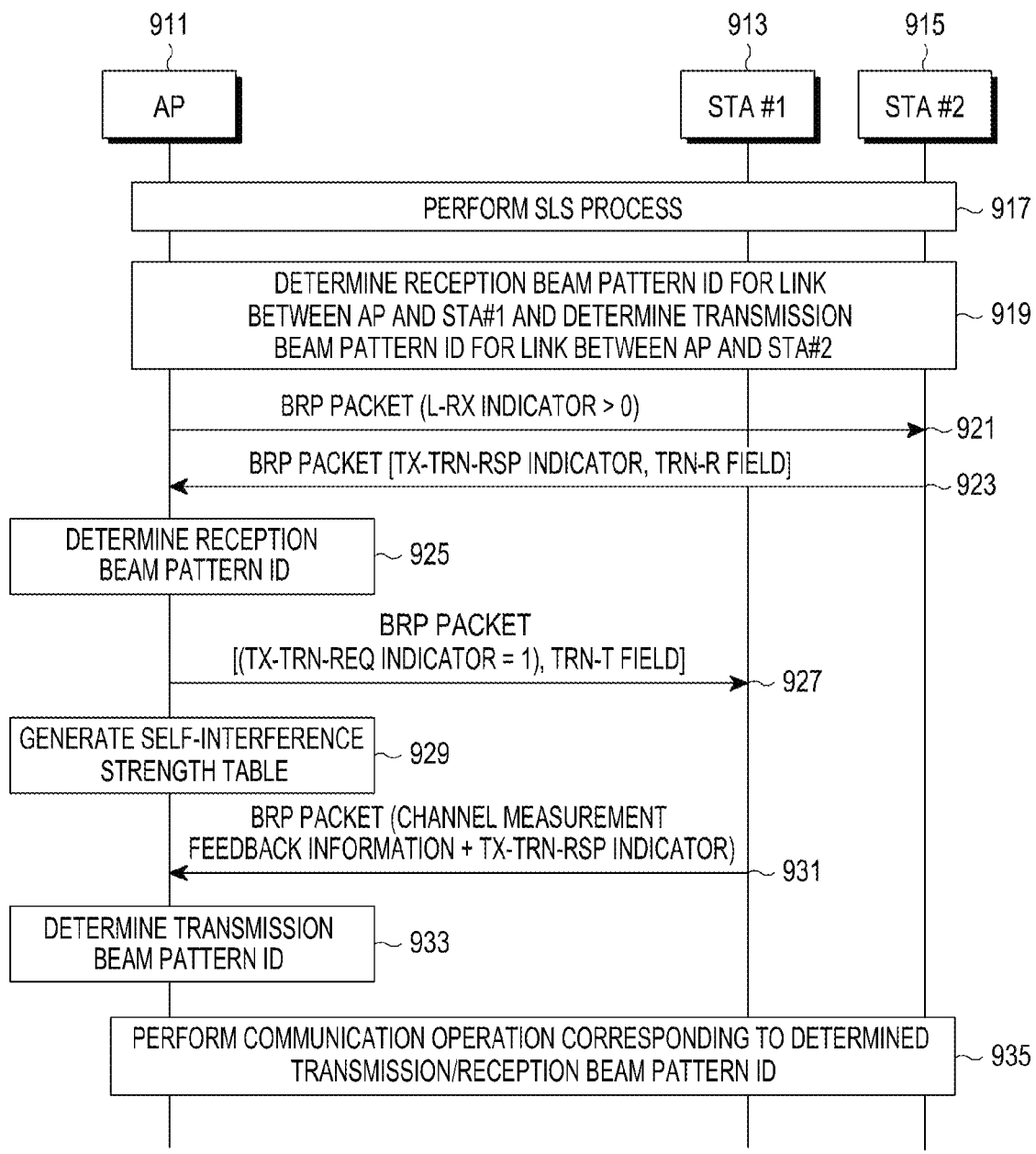
FIG. 9 schematically illustrates still another example of a process for determining a transmission/reception beam pattern for operating a full-duplex scheme in a communication system supporting a beamforming scheme according to an embodiment of the present disclosure.

FIG. 9 schematically illustrates still another example of a process for determining a transmission/reception beam pattern for operating a full-duplex scheme in a communication system supporting a beamforming scheme according to an embodiment of the present disclosure.

Referring to FIG. 9, it will be noted that a transmission/reception beam pattern determining process in FIG. 9 is a transmission/reception beam pattern determining process of determining a transmission beam pattern ID after determining a reception beam pattern ID based on self-interference strength in an AP in a unlimited full-duplex environment. The communication system includes an AP 911, an STA #1 913, and an STA #2 915. Here, the AP 911 firstly determines a reception beam pattern ID of an AP for the STA #2 915, and determines a transmission beam pattern ID for the STA #1 913 after determining the reception beam pattern ID of the AP for the STA #2 915.

Firstly, an SLS process is performed among the AP 911, the STA #1 913, and the STA #2 915 (at operation 917). The SLS process performed among the AP 911, the STA #1 913, and the STA #2 915 is identical to a general SLS process, and a detailed description thereof will be omitted herein.

Then, a reception beam pattern ID of the STA #1 913 for a link between the AP 911 and the STA #1 913 is determined, and a transmission beam pattern ID of the STA #2 915 for a link between the AP 911 and the STA #2 915 is determined through a BRP process among the AP 911, the STA #1 913, and the STA #2 915 (at operation 919). The BRP process in which the reception beam pattern ID of the STA #1 913 for the link between the AP 911 and the STA #1 913 and the transmission beam pattern ID of the STA #2 915 for the link between the AP 911 and the STA #2 915 are determined is identical to a general BRP process, and a detailed description thereof will be omitted herein.

After the reception beam pattern ID for the link between the AP 911 and the STA #1 913 is determined, and the transmission beam pattern ID for the link between the AP 911 and the STA #2 915 is determined, the AP 911 transmits a BRP packet including an L-RX indicator to the STA #2 915 for requesting receive-training (at operation 921). Here, a value of the L-RX indicator is set to a value greater than zero (0). The STA #2 915 receives the BRP packet from the AP 911, and includes a TRN-R field and a RX-TRAIN-RESPONE indicator into the next BRP packet to transmit the next BRP packet to the AP 911 (at operation 923). Here, the RX-TRAIN-RESPONE indicator includes a response to receive-training.

The AP 911 receives the BRP packet from the STA #2 915, generates channel measurement information using the TRN-R field included in the received BRP packet, and determines a reception beam pattern ID for the STA #2 915 based on the generated channel measurement information (at operation 925).

After the reception beam pattern for the link between the AP 911 and the STA #2 915 is determined, the AP 911 transmits a BRP packet including a TX-TRN-REQ indicator and a TRN-T field to the STA #1 913 (at operation 927). Here, a value of the TX-TRN-REQ indicator is set to 1. After transmitting the BRP packet to the STA #1 913, the AP 911 generates a self-interference strength table (at operation 929). Since the AP 911 did not generate a self-interference strength table, the AP 911 generates the self-interference strength table. If the self-interference strength table was generated already, the AP 911 may update the self-interference strength table instead of generating the self-interference strength table.

Meanwhile, the STA #1 913 receives the BRP packet from the AP 911, and generates channel measurement feedback information through the TRN-T field included in the received BRP packet. The STA #1 913 includes the generated channel measurement feedback information into the next BRP packet to transmit the next BRP packet to the AP 911 (at operation 931). Here, the BRP packet includes a TX-TRAIN-RESPONSE indicator indicating a response to transmit-training.

The AP 911 receives the BRP packet transmitted by the STA #1 913, and determines a transmission beam pattern ID for STA #1 913 the based on the channel measurement feedback information included in the BRP packet and the generated self-interference strength table (at operation 933).

Each of the AP 911, the STA #1 913, and the STA #2 915 performs a link adaptation operation based on channel measurement feedback information, and performs a communication operation one another using the determined transmission beam pattern ID and reception beam pattern ID (at operation 935). The link adaptation operation is an operation of adaptively determining a modulation scheme and a code rate based on the channel measurement feedback information, and a detailed description of the link adaptation operation will be omitted herein.

Still another example of a process for determining a transmission/reception beam pattern for operating a full-duplex scheme in a communication system supporting a beamforming scheme according to an embodiment of the present disclosure has been described with reference to FIG. 9, and still another example of a process for determining a transmission/reception beam pattern for operating a full-duplex scheme in a communication system supporting a beamforming scheme according to an embodiment of the present disclosure will be described with reference to FIG. 10.

Figure 10:
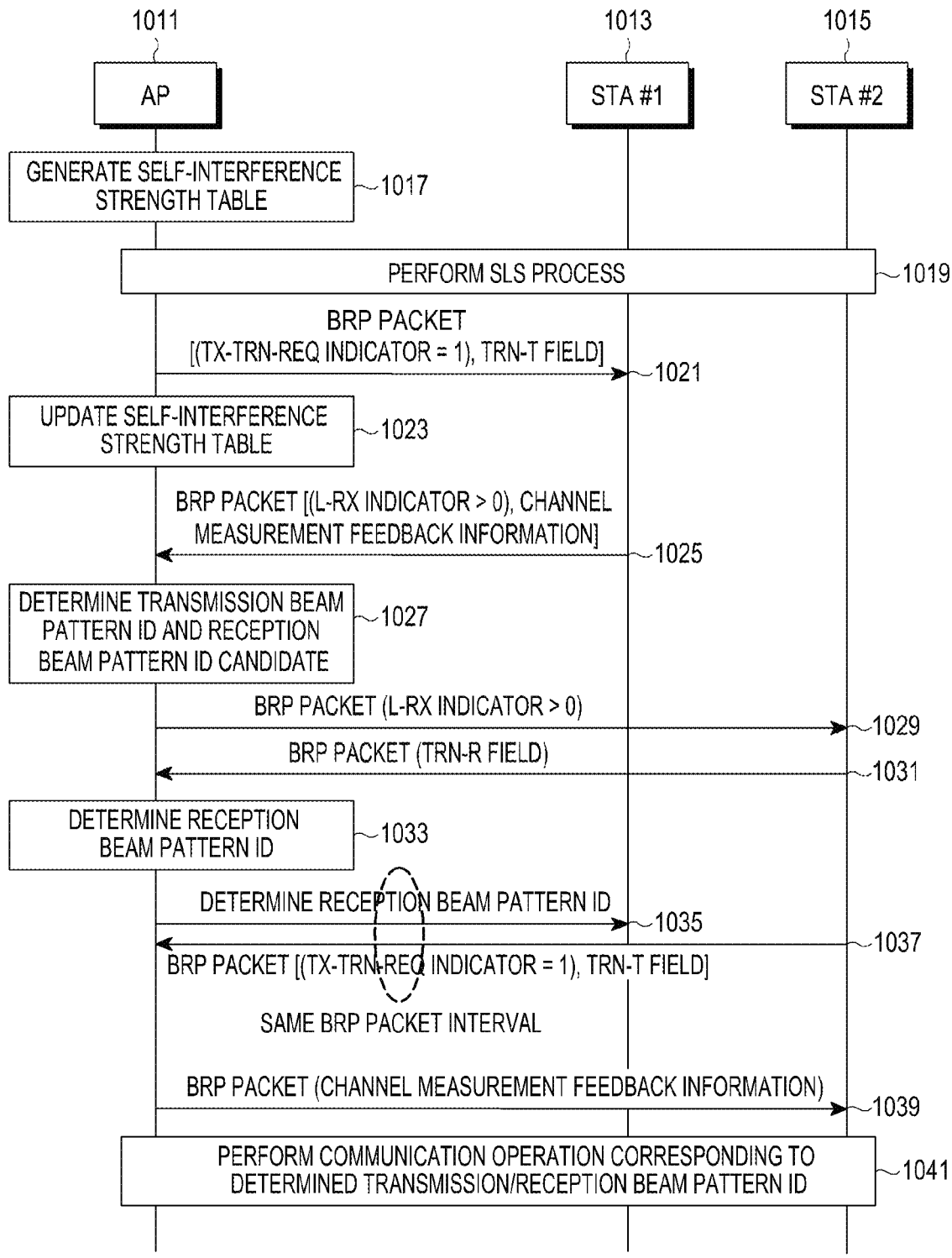
FIG. 10 schematically illustrates still another example of a process for determining a transmission/reception beam pattern for operating a full-duplex scheme in a communication system supporting a beamforming scheme according to an embodiment of the present disclosure.

FIG. 10 schematically illustrates still another example of a process for determining a transmission/reception beam pattern for operating a full-duplex scheme in a communication system supporting a beamforming scheme according to an embodiment of the present disclosure.

Referring to FIG. 10, it will be noted that a transmission/reception beam pattern determining process in FIG. 10 is a transmission/reception beam pattern determining process of determining a reception beam pattern ID after determining a transmission beam pattern ID based on self-interference strength in an AP in a unlimited full-duplex environment. The communication system includes an AP 1011, an STA #1 1013, and an STA #2 1015. Here, the AP 1011 firstly determines a transmission beam pattern ID for the STA #1 1013, and determines a reception beam pattern ID for the STA #2 1015 after determining the transmission beam pattern ID for the STA #1 1013.

Firstly, the AP 1011 generates a self-interference strength table (at operation 1017). A scheme of generating the self-interference strength table may be the same as described above, and a detailed description thereof will be omitted herein. Then, an SLS process is performed among the AP 1011, the STA #1 1013, and the STA #2 1015 (at operation 1019). The SLS process performed among the AP 1011, the STA #1 1013, and the STA #2 1015 is identical to a general SLS process, and a detailed description thereof will be omitted herein.

After the SLS process is performed among the AP 1011, the STA #1 1013, and the STA #2 1015, the AP 1011 transmits a BRP packet including a TX-TRN-REQ indicator and a TRN-T field to the STA #1 1013 (at operation 1021). Here, a value of the TX-TRN-REQ indicator is set to 1. After transmitting the BRP packet to the STA #1 1013, the AP 1011 updates a self-interference strength table (at operation 1023). Since the AP 1011 generated the self-interference strength table already, so the AP 1011 updates the self-interference strength table. If the self-interference strength table is not generated, the AP 1011 may generate the self-interference strength table.

Meanwhile, the STA #1 1013 receives the BRP packet from the AP 1011, and generates channel measurement feedback information through the TRN-T field included in the received BRP packet. The STA #1 1013 includes the generated channel measurement feedback information into the next BRP packet to transmit the next BRP packet to the AP 1011 (at operation 1025). Here, the BRP packet includes an L-RX indicator for requesting receive-training, and a value of the L-RX indicator is set to a value greater than zero (0).

The AP 1011 receives the BRP packet transmitted by the STA #1 1013, determines a transmission beam pattern ID for the STA #1 1013 based on the channel measurement feedback information included in the BRP packet and the updated self-interference strength table, and determines a reception beam pattern ID candidate for the STA #2 1015 (at operation 1027).

The AP 1011 transmits a BRP packet including an L-RX indicator for requesting receive-training to the STA #2 1015 (at operation 1029). Here, a value of the L-RX indicator is set to a value greater than zero (0). The STA #2 1015 receives the BRP packet from the AP 1011, and transmits the next BRP packet including a TRN-R field to the AP 1011 (at operation 1031).

The AP 1011 receives the BRP packet transmitted by the STA #2 1015, generates channel measurement information using the TRN-R field included in the received BRP packet, and determines a reception beam pattern ID for the STA #2 1015 based on the updated self-interference strength table and the channel measurement information (at operation 1033).

After determining the reception beam pattern ID for the STA #2 1015, the AP 1011 transmits, to the STA #1 1013, a BRP packet including a TRN-R field using the transmission beam pattern ID determined for the STA #1 1013 in the next BRP packet interval, i.e., the same BRP packet interval (at operation 1035), and receives a BRP packet from the STA #2 1015 using the reception beam pattern ID determined for the STA #2 1015 (at operation 1037). The BRP packet includes a TX-TRN-REQ indicator, and a value of the TX-TRN-REQ indicator is set to 1.

The AP 1011 generates channel measurement feedback information through the TRN-T field included in the BRP packet received from the STA #2 1015, and transmits a BRP packet including the generated channel measurement feedback information to the STA #2 1015 (at operation 1039).

Each of the AP 1011, the STA #1 1013, and the STA #2 1015 performs a link adaptation operation based on channel measurement feedback information, and performs a communication operation one another using the determined transmission beam pattern ID and reception beam pattern ID (at operation 1041). The link adaptation operation is an operation of adaptively determining a modulation scheme and a code rate based on the channel measurement feedback information, and a detailed description of the link adaptation will be omitted herein.

Still another example of a process for determining a transmission/reception beam pattern for operating a full-duplex scheme in a communication system supporting a beamforming scheme according to an embodiment of the present disclosure has been described with reference to FIG. 10, and still another example of a process for determining a transmission/reception beam pattern for operating a full-duplex scheme in a communication system supporting a beamforming scheme according to an embodiment of the present disclosure will be described with reference to FIG. 11.

Figure 11:
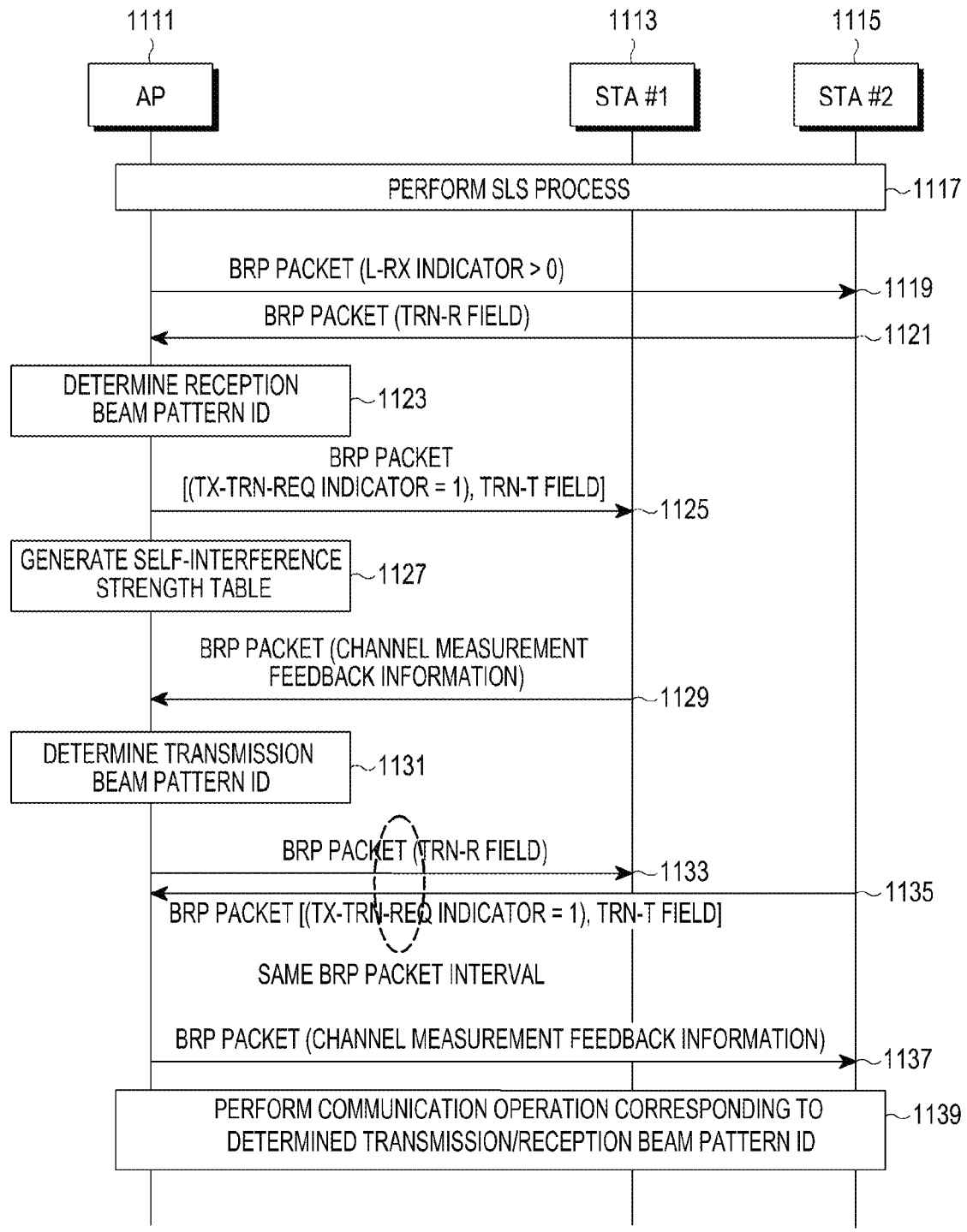
FIG. 11 schematically illustrates still another example of a process for determining a transmission/reception beam pattern for operating a full-duplex scheme in a communication system supporting a beamforming scheme according to an embodiment of the present disclosure.

FIG. 11 schematically illustrates still another example of a process for determining a transmission/reception beam pattern for operating a full-duplex scheme in a communication system supporting a beamforming scheme according to an embodiment of the present disclosure.

Referring to FIG. 11, it will be noted that a transmission/reception beam pattern determining process in FIG. 11 is a transmission/reception beam pattern determining process of determining a transmission beam pattern ID after determining a reception beam pattern ID based on self-interference strength in an AP in a unlimited full-duplex environment. The communication system includes an AP 1111, an STA #1 1113, and an STA #2 1115. Here, the AP 1111 firstly determines a reception beam pattern ID for the STA #2 1115, and determines a transmission beam pattern ID for the STA #1 1113 after determining the reception beam pattern ID for the STA #2 1115.

Firstly, an SLS process is performed among the AP 1111, the STA #1 1113, and the STA #2 1115 (at operation 1117). The SLS process performed among the AP 1111, the STA #1 1113, and the STA #2 1115 is identical to a general SLS process, and a detailed description thereof will be omitted herein.

The AP 1111 transmits a BRP packet including an L-RX indicator to the STA #2 1115 for requesting receive-training (at operation 1119). Here, a value of the L-RX indicator is set to a value greater than zero (0). The STA #2 1115 receives the BRP packet from the AP 1111, and transmits the next BRP packet including a TRN-R field to the AP 1111 (at operation 1121).

The AP 1111 receives the BRP packet from the STA #2 1115, generates channel measurement information using the TRN-R field included in the received BRP packet, and determines a reception beam pattern ID for the STA #2 1115 based on the channel measurement information (at operation 1123).

After the reception beam pattern ID for the link between the AP 1111 and the STA #2 1115 is determined, the AP 1111 transmits a BRP packet including a TX-TRN-REQ indicator and a TRN-T field to the STA #1 1113 (at operation 1125). Here, a value of the TX-TRN-REQ indicator is set to 1. After transmitting the BRP packet to the STA #1 1113, the AP 1111 generates a self-interference strength table (at operation 1127). Since the AP 1111 did not generate the self-interference strength table, so the AP 1111 generates the self-interference strength table. If the self-interference strength table was generated already, so the AP 1111 may update the self-interference strength table instead of generating the self-interference strength table.

Meanwhile, the STA #1 1113 receives a BRP packet from the AP 1111, and generates channel measurement feedback information through the TRN-T field included in the received BRP packet. The STA #1 1113 includes the generated channel measurement feedback information into the next BRP packet to transmit the next BRP packet to the AP 1111 (at operation 1129).

The AP 1111 receives the BRP packet transmitted by the STA #1 1113, and determines a transmission beam pattern ID for the STA #1 1113 based on the channel measurement feedback information included in the BRP packet and the generated self-interference strength table (at operation 1131).

After determining the transmission beam pattern ID for the STA #1 1113, the AP 1111 transmits, to the STA #1 1113, a BRP packet including a TRN-R field using the transmission beam pattern ID determined for the STA #1 1113 in the next BRP packet interval, i.e., the same BRP packet interval (at operation 1133), and receives a BRP packet including a TRN-T field from the STA #2 1115 using the reception beam pattern ID determined for the STA #2 1115 (at operation 1135). The BRP packet includes a TX-TRN-REQ indicator, and a value of the TX-TRN-REQ indicator is set to 1.

The AP 1111 generates channel measurement feedback information through the TRN-T field included in the BRP packet received from the STA #2 1115, and transmits a BRP packet including the generated channel measurement feedback information to the STA #2 1115 (at operation 1137).

Each of the AP 1111, the STA #1 1113, and the STA #2 1115 performs a link adaptation operation based on channel measurement feedback information, and performs a communication operation one another using the determined transmission beam pattern ID and reception beam pattern ID (at operation 1139). The link adaptation operation is an operation of adaptively determining a modulation scheme and a code rate based on the channel measurement feedback information, and a detailed description of the link adaptation operation will be omitted herein.

Still another example of a process for determining a transmission/reception beam pattern for operating a full-duplex scheme in a communication system supporting a beamforming scheme according to an embodiment of the present disclosure has been described with reference to FIG. 11, and a super frame structure for operating a full-duplex scheme in a communication system supporting a beamforming scheme according to an embodiment of the present disclosure will be described with reference to FIG. 12.

Figure 12:
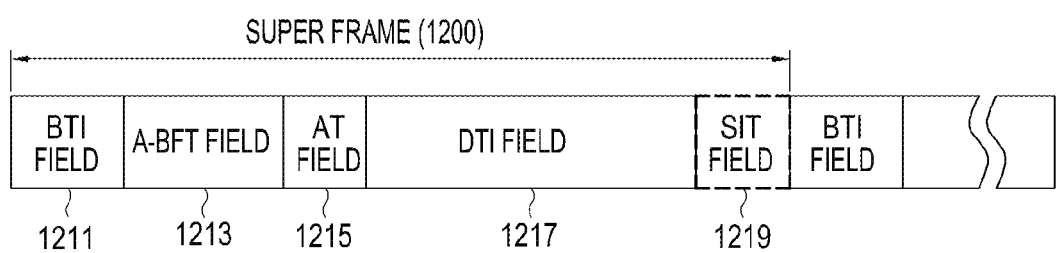
FIG. 12 schematically illustrates a super frame structure for operating a full-duplex scheme in a communication system supporting a beamforming scheme according to an embodiment of the present disclosure.

FIG. 12 schematically illustrates a super frame structure for operating a full-duplex scheme in a communication system supporting a beamforming scheme according to an embodiment of the present disclosure.

Referring to FIG. 12, a super frame 1200 includes a beacon transmission interval (BTI) field 1211, an association beamforming training (A-BFT) field 1213, an announcement transmission (AT) field 1215, a data transfer interval (DTI) field 1217, and a self-interference training (SIT) field 1219.

The super frame 1200 becomes a beacon interval.

An embodiment of the present disclosure performs a updating operation for a self-interference strength table or a self-interference DoA table for reflecting strong environmental reflection change. Here, an interval before the next BTI field starts, i.e., an interval after the DTI field 1217 or a specific interval within the DTI field 1217 is set as the SIT field 1219, and a updating operation for a self-interference strength table or a self-interference DoA table is performed using the SIT field 1219.

In FIG. 12, the super frame 1200 includes the BTI field 1211, the A-BFT field 1213, the AT field 1215, the DTI field 1217, and the SIT field 1219 in a sequential order, however, an order of the BTI field 1211, the A-BFT field 1213, the AT field 1215, the DTI field 1217, and the SIT field 1219 may be changed.

In FIG. 12, the BTI field 1211, the A-BFT field 1213, the AT field 1215, the DTI field 1217, and the SIT field 1219 are shown in a form of 'field', and may be practically a specific interval within the beacon interval 1200.

A super frame structure for operating a full-duplex scheme in a communication system supporting a beamforming scheme according to an embodiment of the present disclosure has been described with reference to FIG. 12, and a beacon frame structure for operating a full-duplex scheme in a communication system supporting a beamforming scheme according to an embodiment of the present disclosure will be described with reference to FIG. 13.

Figure 13:
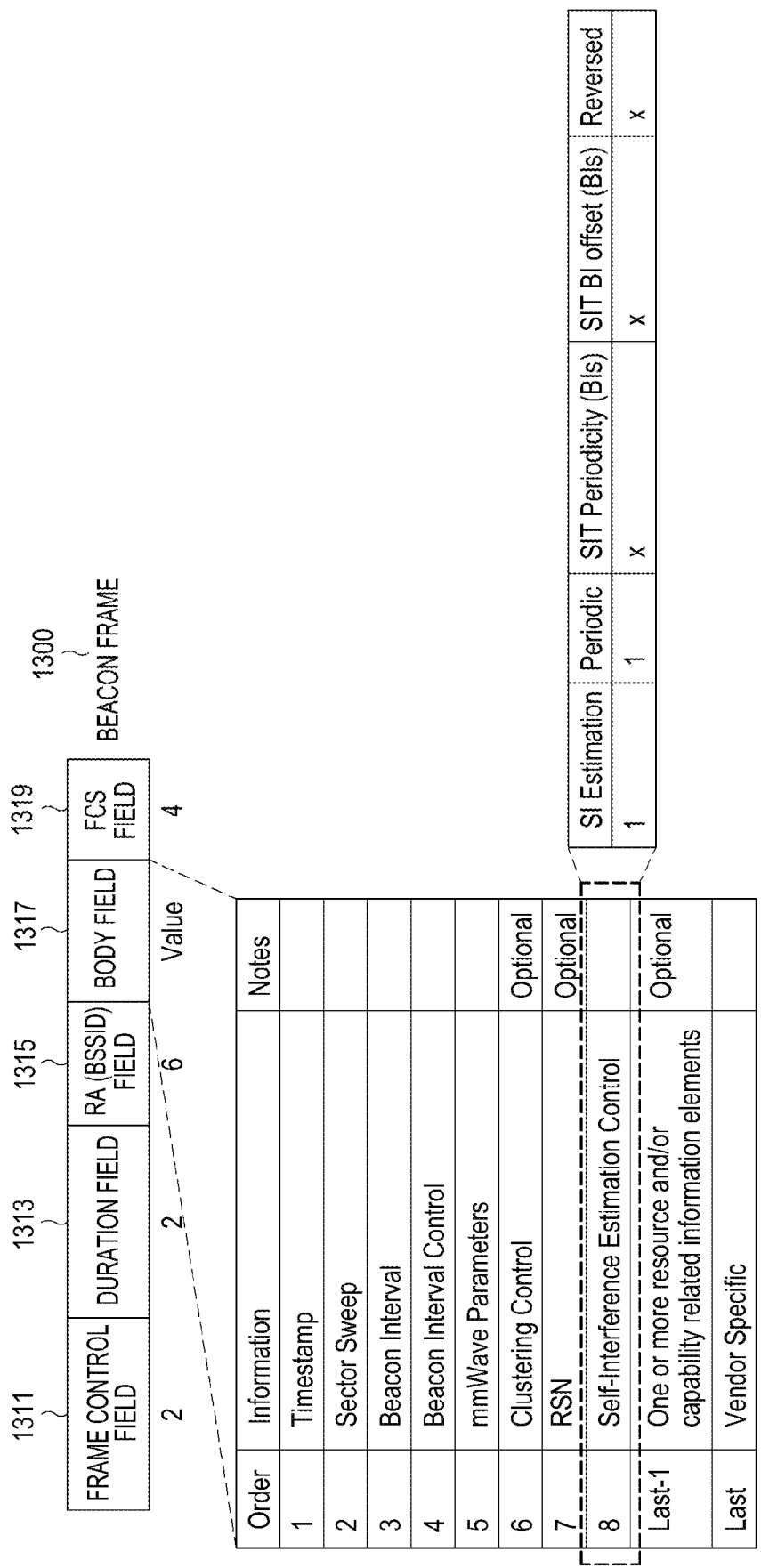
FIG. 13 schematically illustrates a beacon frame structure for operating a full-duplex scheme in a communication system supporting a beamforming scheme according to an embodiment of the present disclosure.

FIG. 13 schematically illustrates a beacon frame structure for operating a full-duplex scheme in a communication system supporting a beamforming scheme according to an embodiment of the present disclosure.

Referring to FIG. 13, a beacon frame 1300 includes a frame control field 1311, a duration field 1313, a receiver address (RA) field 1315, a body field 1317, and a frame check sequence (FCS) field 1319.

The body field 1317 may include various fields, and the body field 1317 includes a time stamp field, a sector sweep field, a beacon interval field, a beacon interval control field, a millimeter wave (mmwave) parameters field, a clustering control field, a robust security network (RSN) field, a self-interference estimation control field, an one or more resource and/or capability related information elements field, and a vender specific field.

The time stamp field, the sector sweep field, the beacon interval field, the beacon interval control field, the mmwave parameters field, the clustering control field, the RSN field, the one or more resource and/or capability related information elements field, and the vender specific field which the body field 1317 includes are identical to a time stamp field, a sector sweep field, a beacon interval field, a beacon interval control field, an mmwave parameters field, a clustering control field, a RSN field, an one or more resource and/or capability related information elements field, and a vender specific field used in a general IEEE 802.11 system, a detailed description thereof will be omitted herein, and only the self-interference estimation control field will be described.

The self-interference estimation control field includes a self-interference (SI) estimation field, a periodic field, an SIT periodicity field, an SIT BI offset field, and a reserved field.

The periodic field is a field indicating information related to whether an SIT is periodic, and may be implemented with, for example, 1 bit. For example, if a field value of the periodic field is 1, it means that the SIT is periodic. Alternatively, if a field value of the periodic field is 0, it means that the SIT is aperiodic.

If the SIT is periodic, that is, if the field value of the periodic field is set to 1, the SIT periodicity field indicates a period of the SIT, and may be implemented with, for example, x bits.

If the SIT is periodic, that is, if the field value of the periodic field is set to 1, the SIT BI offset field indicates a start timing of the SIT. If the SIT is aperiodic, that is, if the field value of the periodic field is set to 0, the SIT BI offset field indicates a location of the SIT. The SIT BI offset field may be implemented with, for example, x bits.

As described in FIG. 12, an embodiment of the present disclosure performs a updating operation for a self-interference strength table or a self-interference DoA table for reflecting strong environmental reflection change. Here, the updating operation for the self-interference strength table or the self-interference DoA table may be performed periodically or a periodically, and is triggered by the self-interference estimation control field included in the body field 1317 included in the beacon frame 1300.

In FIG. 13, the beacon frame 1300 includes the frame control field 1311, the duration field 1313, the RA field 1315, the body field 1317, and the FCS field 1319 in a sequential order, however, an order of the frame control field 1311, the duration field 1313, the RA field 1315, the body field 1317, and the FCS field 1319 may be changed.

In FIG. 13, the frame control field 1311, the duration field 1313, the RA field 1315, the body field 1317, and the FCS field 1319 are shown in form of 'field', and is practically a specific interval within the beacon interval 1300.

A beacon frame structure for operating a full-duplex scheme in a communication system supporting a beamforming scheme according to an embodiment of the present disclosure has been described with reference to FIG. 13, and a frame structure and signaling for operating a full-duplex scheme in a communication system supporting a beamforming scheme according to an embodiment of the present disclosure will be described with reference to FIG. 14.

FIG. 14 schematically illustrates a frame structure and signaling for operating a full-duplex scheme in a communication system supporting a beamforming scheme according to an embodiment of the present disclosure.

Referring to FIG. 14, it will be noted that a frame structure and signaling in FIG. 14 is a frame structure and signaling for requesting channel quality information, e.g., an SINR, included in channel measurement feedback information. Feedback of an SINR becomes an important fact in order that a transmission/reception beam pattern determining operation and a link adaptation operation proposed in an embodiment of the present disclosure are correctly performed, so one of reserved bits included in a directional multi-gigabit (DMG) beam refinement element included in a BRP packet is used as an SINR requested field for requesting SINR feedback.

Currently, in an IEEE 802.11 communication system, the number of the reserved bits included in the DMG beam refinement element is 2, and one of the two reserved bits is used as the SINR requested field.

A frame structure and signaling for operating a full-duplex scheme in a communication system supporting a beamforming scheme according to an embodiment of the present disclosure has been described with reference to FIG. 14, and a beam nulling process considering self-interference in a communication system supporting a beamforming scheme according to an embodiment of the present disclosure will be described with reference to FIG. 15.

Figure 15:
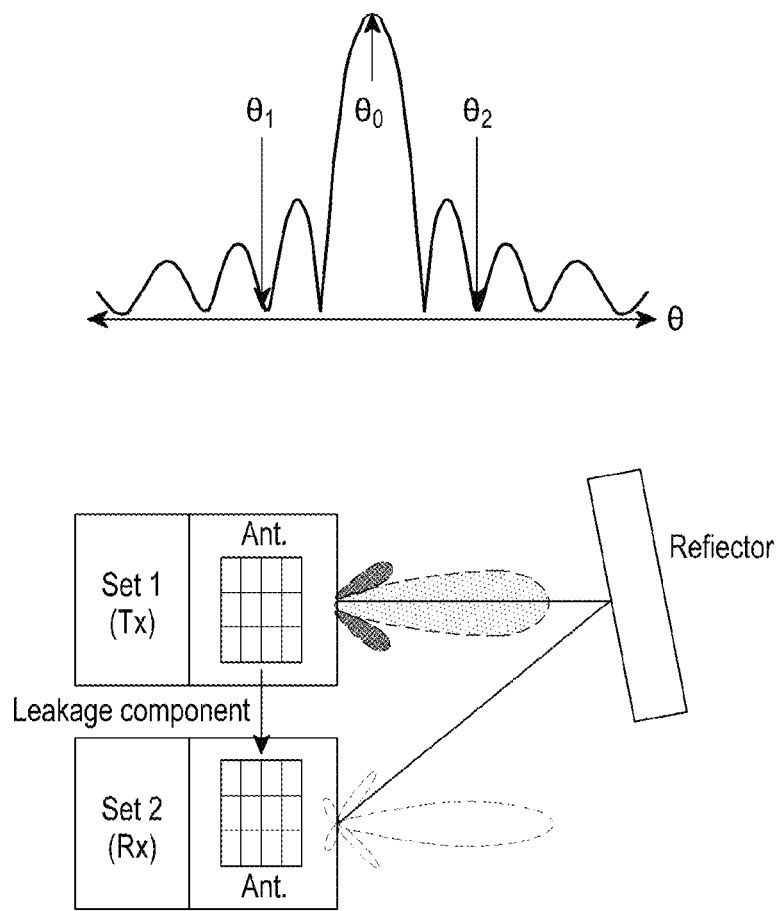
FIG. 15 schematically illustrates a beam nulling process considering self-interference in a communication system supporting a beamforming scheme according to an embodiment of the present disclosure.

FIG. 15 schematically illustrates a beam nulling process considering self-interference in a communication system supporting a beamforming scheme according to an embodiment of the present disclosure.

Referring to FIG. 15, a transmission/reception beam nulling scheme is applied toward a transmission leakage signal direction and a reflection signal direction. In a case that the transmission/reception beam nulling scheme is applied, only leakage components and reflection components which have great power which is enough to be out of an ADC dynamic range among leakage components and reflection components are considered.

Each reflection component is received in a specific DoA, so a reception beam needs to be designed by considering a DoA of a leakage/reflection component which has great power which is enough to be out of an ADC dynamic range. So, a self-interference DoA table according to a transmission/reception beam pattern ID and an antenna weight vector is generated.

A beam nulling process considering self-interference in a communication system supporting a beamforming scheme according to an embodiment of the present disclosure has been described with reference to FIG. 15, and still another example of a process for determining a transmission/reception beam pattern for operating a full-duplex scheme in a communication system supporting a beamforming scheme according to an embodiment of the present disclosure will be described with reference to FIG. 16.

Figure 16:
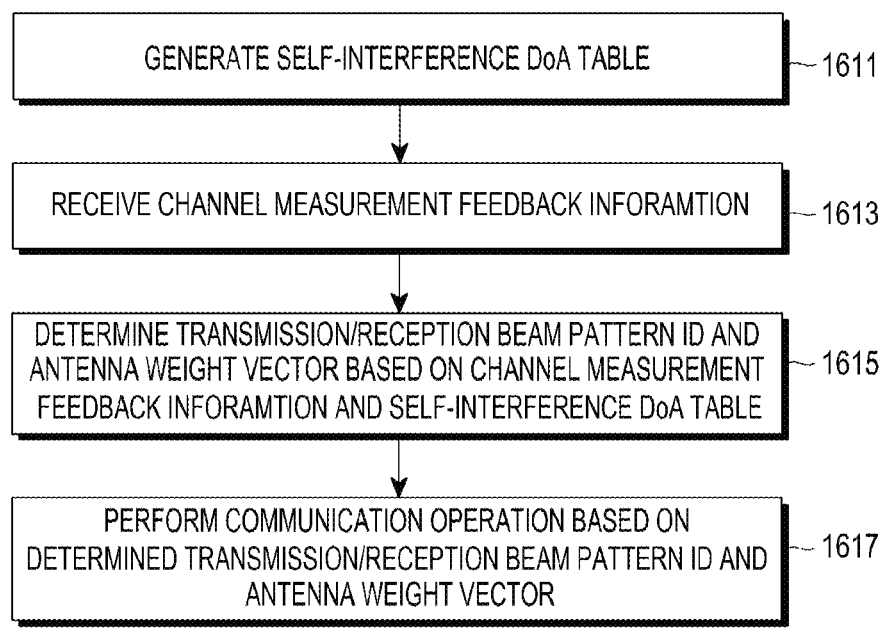
FIG. 16 schematically illustrates still another example of a process for determining a transmission/reception beam pattern for operating a full-duplex scheme in a communication system supporting a beamforming scheme according to an embodiment of the present disclosure.

FIG. 16 schematically illustrates still another example of a process for determining a transmission/reception beam pattern for operating a full-duplex scheme in a communication system supporting a beamforming scheme according to an embodiment of the present disclosure.

Referring to FIG. 16, an AP generates a self-interference DoA table based on a transmission/reception beam pattern ID and an antenna weight vector at operation 1611, and proceeds to operation 1613. Here, a process of generating the self-interference DoA table may be similar to a process of generating a self-interference strength table. For example, the AP measures a self-interference DoA while sweeping transmission beam pattern IDs for each of reception beam pattern IDs, and generates a self-interference DoA table based on the measured result of the self-interference DoA.

The AP receives channel measurement feedback information from each of STAs to which the AP provides a service at operation 1613, and proceeds to operation 1615. The AP determines a transmission/reception beam pattern ID and an antenna weight vector for each of the STAs based on the channel measurement feedback information received from each of the STAs and the self-interference DoA table at operation 1615, and proceeds to operation 1617. The AP performs a communication operation with the STAs using the determined transmission/reception beam pattern ID and antenna weight vector at operation 1617.

The AP may update periodically or aperiodically the self-interference DoA table.

The AP may update the self-interference DoA table through a multiple sector identifier (MID)/beamforming process.

The AP may update the self-interference DoA table through an SLS process and a BRP process.

The AP may update the self-interference DoA table even through there is no traffic.

The AP may set an interval for updating the self-interference DoA table. If the interval for updating the self-interference DoA table is set, the interval for updating the self-interference DoA table may be set using a super frame as described in FIG. 12 and a beacon frame as described in FIG. 13.

Still another example of a process for determining a transmission/reception beam pattern for operating a full-duplex scheme in a communication system supporting a beamforming scheme according to an embodiment of the present disclosure has been described with reference to FIG. 16, and still another example of a process for determining a transmission/reception beam pattern for operating a full-duplex scheme in a communication system supporting a beamforming scheme according to an embodiment of the present disclosure will be described with reference to FIG. 17.

Figure 17:
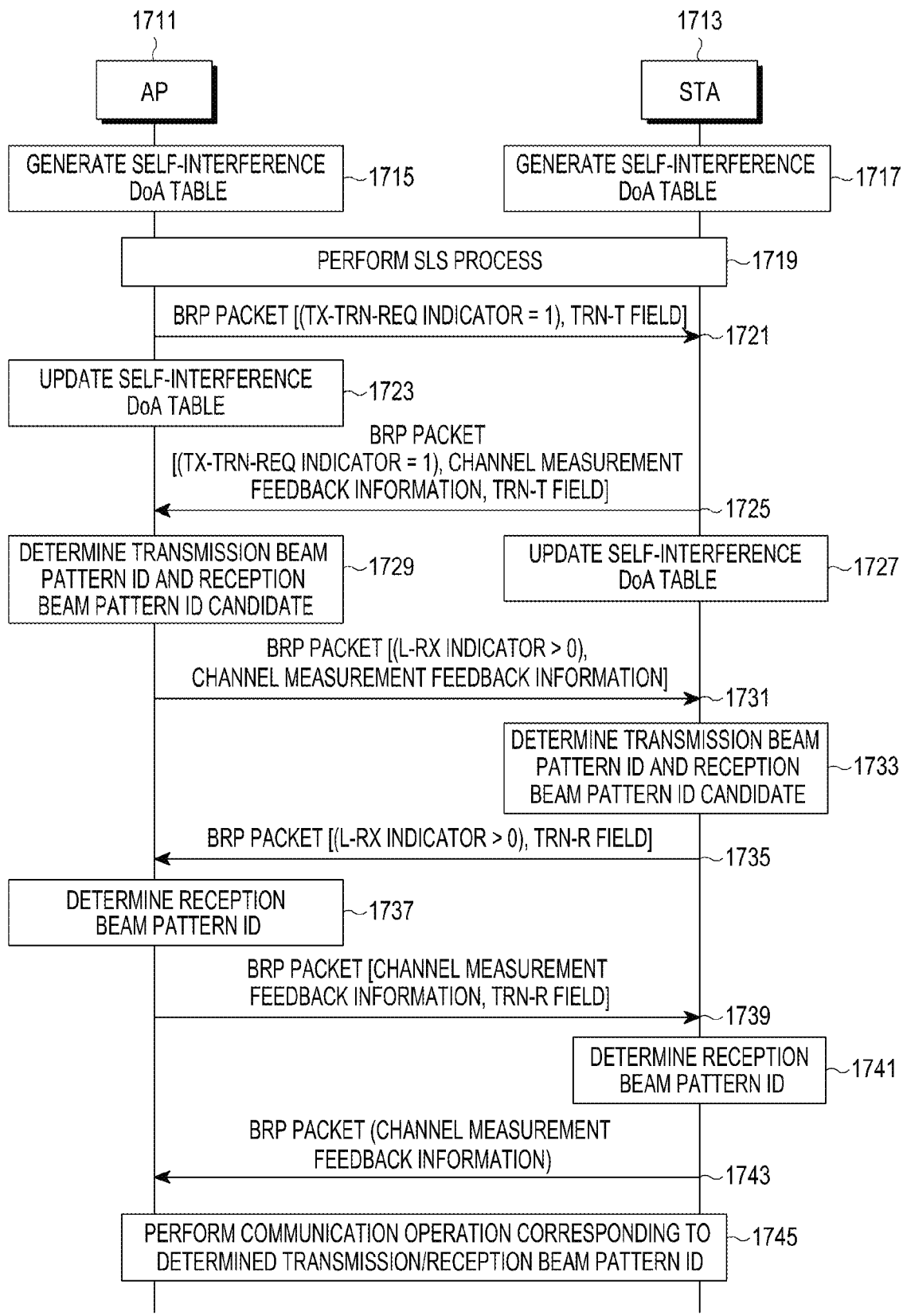
FIG. 17 schematically illustrates still another example of a process for determining a transmission/reception beam pattern for operating a full-duplex scheme in a communication system supporting a beamforming scheme according to an embodiment of the present disclosure.

FIG. 17 schematically illustrates still another example of a process for determining a transmission/reception beam pattern for operating a full-duplex scheme in a communication system supporting a beamforming scheme according to an embodiment of the present disclosure.

Referring to FIG. 17, it will be noted that a transmission/reception beam pattern determining process in FIG. 17 is a process for determining a transmission/reception beam pattern based on a self-interference DoA in a pair-wise full-duplex environment. The communication system includes an AP 1711 and an STA 1713.

Each of the AP 1711 and the STA 1713 generates a self-interference DoA table (at operations 1715 and 1717). A scheme of generating the self-interference DoA table may be the same as described above, and a detailed description thereof will be omitted herein. Then, an SLS process is performed between the AP 1711 and the STA 1713 (at operation 1719). The SLS process performed between the AP 1711 and the STA 1713 is identical to a general SLS process, and a detailed description thereof will be omitted herein.

After the SLS process is performed between the AP 1711 and the STA 1713, the AP 1711 transmits a BRP packet including a TX-TRN-REQ indicator and a TRN-T field to the STA 1713 (at operation 1721). Here, a value of the TX-TRN-REQ indicator is set to 1. After transmitting the BRP packet to the STA 1713, the AP 1711 updates a self-interference DoA table (at operation 1723). Since the AP 1711 generated the self-interference DoA table already, the AP 1711 updates the self-interference DoA table. If the self-interference DoA table is not generated, the AP 1711 may generate the self-interference DoA table.

After receiving the BRP packet from the AP 1711, the STA 1713 generates channel measurement feedback information based on the TRN-T field included in the BRP packet. The STA 1713 includes the generated channel measurement feedback information into the next BRP packet to transmit the next BRP packet to the AP 1711 (at operation 1725). The BRP packet includes a TX-TRN-REQ indicator, and a value of the TX-TRN-REQ indicator is set to 1. The BRP packet includes a TRN-T field.

After transmitting the BRP packet, the STA 1713 updates a self-interference DoA table (at operation 1727). Since the STA 1713 generated the self-interference DoA table already, the STA 1713 updates the self-interference DoA table. If the self-interference DoA table is not generated, the AP 1711 may generate the self-interference DoA table.

After receiving the BRP packet from STA 1713, the AP 1711 determines a transmission beam pattern ID to be applied to the STA 1713 based on the channel measurement feedback information included in the BRP packet and the self-interference DoA table, and determines a reception beam pattern ID candidate based on the determined transmission beam pattern ID (at operation 1729). In a case of determining the reception beam pattern ID candidate based on the determined transmission beam pattern ID and the self-interference DoA table, the number of refinement reception beam pattern IDs used for determining a reception beam pattern ID in a BRP process may be decreased.

The AP 1711 generates channel measurement feedback information based on the determined transmission beam pattern ID, and includes the generated channel measurement feedback information into the next BRP packet to transmit the next BRP packet to the STA 1713 (at operation 1731). The BRP packet includes an L-RX indicator. Here, a value of the L-RX indicator is set to a value greater than zero (0). After receiving the BRP packet from the AP 1711, the STA 1713 determines a transmission beam pattern ID to be applied to the AP 1711 based on the channel measurement feedback information included in the BRP packet and the self-interference DoA table, and determines a reception beam pattern ID candidate based on the determined transmission beam pattern ID and the self-interference DoA table (at operation 1733). In a case of determining the reception beam pattern ID candidate based on the determined transmission beam pattern ID and the self-interference DoA table, the number of refinement reception beam pattern IDs used for determining a reception beam pattern ID in a BRP process may be decreased. The STA 1713 transmits the next BRP packet including a TRN-R field using the determined transmission beam pattern ID (at operation 1735). The BRP packet includes an L-RX indicator, and a value of the L-RX indicator is set to a value greater than zero (0).

The AP 1711 receives the BRP packet from the STA 1713 based on the determined reception beam pattern ID candidate, and determines a reception beam pattern ID using the TRN-R field included in the BRP packet (at operation 1737). The AP 1711 transmits the next BRP packet including a TRN-R field for the STA 1713 to the STA 1713 (at operation 1739). Here, the BRP packet includes channel measurement feedback information based on the self-interference DoA table and the determined transmission beam pattern ID and reception beam pattern ID.

The STA 1713 receives the BRP packet from the AP 1711 based on the determined reception beam pattern ID candidate, and determines a reception beam pattern ID using the TRN-R field included in the BRP packet (at operation 1741). The STA 1713 determines generates channel measurement feedback information based on the self-interference DoA table, and the determined transmission beam pattern ID and reception beam pattern ID, and transmits a BRP packet including the generated channel measurement feedback information to the AP 1711 (at operation 1743).

Each of the AP 1711 and the STA 1713 performs a link adaptation operation based on channel measurement feedback information, and performs a communication operation each another using the determined transmission beam pattern ID and reception beam pattern ID (at operation 1745).

The link adaptation operation is an operation of adaptively determining a modulation scheme and a code rate based on the channel measurement feedback information, and a detailed description thereof will be omitted herein.

A self-interference DoA table updating process as described in FIG. 17 is a process for verifying a self-interference DoA table which was generated already using a full-duplex characteristic, and whether a self-interference DoA is changed is check by receiving a signal based on the self-interference DoA table which was generated already.

So, self-interference suppression may be increased through a beam nulling process which is based on a self-interference DoA as described in FIG. 17.

Still another example of a process for determining a transmission/reception beam pattern for operating a full-duplex scheme in a communication system supporting a beamforming scheme according to an embodiment of the present disclosure has been described with reference to FIG. 17, and still another example of a process for determining a transmission/reception beam pattern for operating a full-duplex scheme in a communication system supporting a beamforming scheme according to an embodiment of the present disclosure will be described with reference to FIG. 18.

Figure 18:
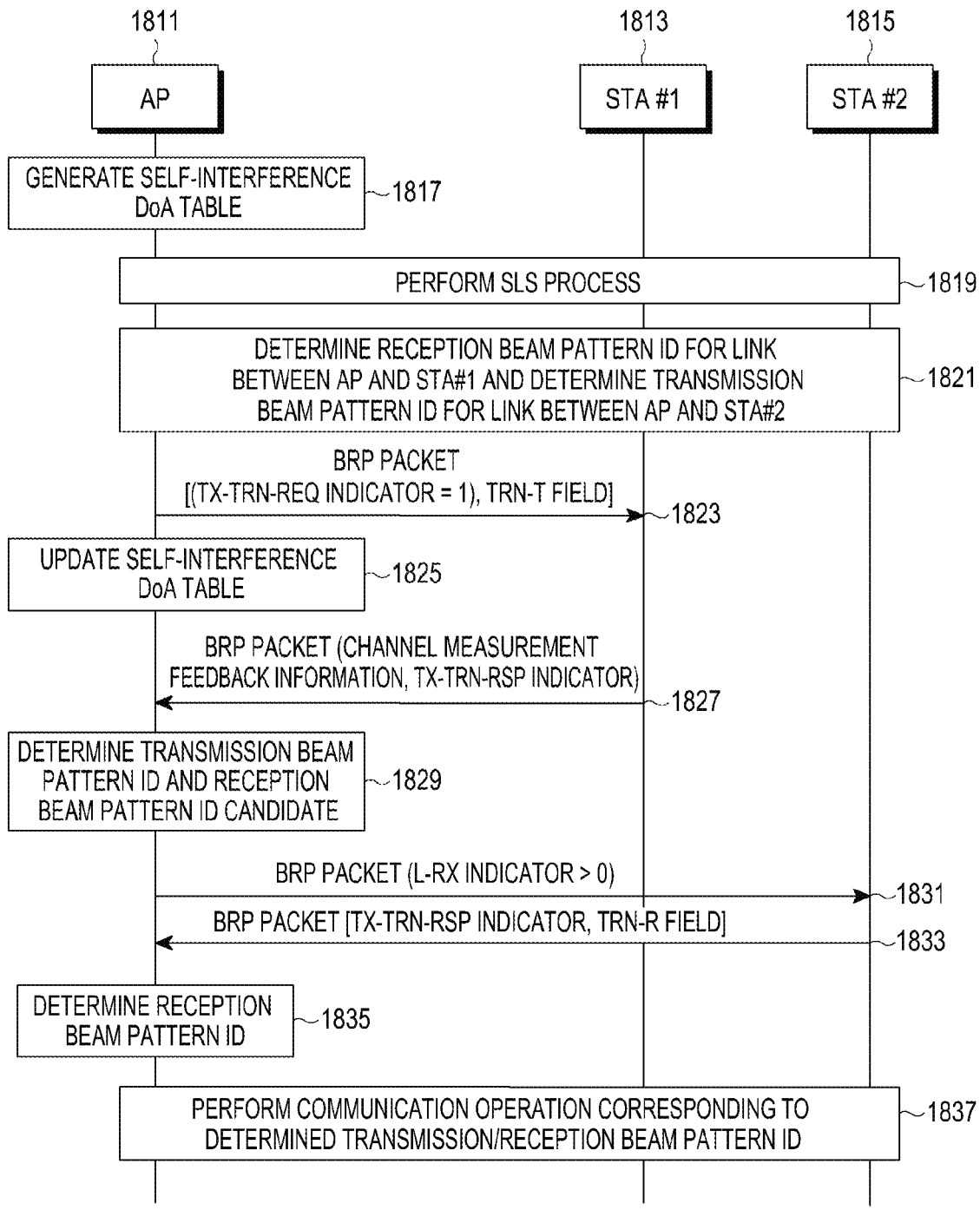
FIG. 18 schematically illustrates still another example of a process for determining a transmission/reception beam pattern for operating a full-duplex scheme in a communication system supporting a beamforming scheme according to an embodiment of the present disclosure.

FIG. 18 schematically illustrates still another example of a process for determining a transmission/reception beam pattern for operating a full-duplex scheme in a communication system supporting a beamforming scheme according to an embodiment of the present disclosure.

Referring to FIG. 18, it will be noted that a transmission/reception beam pattern determining process in FIG. 18 is a transmission/reception beam pattern determining process of determining a reception beam pattern ID after determining a transmission beam pattern ID based on a self-interference DoA in an AP in a unlimited full-duplex environment. The communication system includes an AP 1811, an STA #1 1813, and an STA #2 1815. Here, the AP 1811 firstly determines a transmission beam pattern ID for the STA #1 1813, and determines a reception beam pattern ID for the STA #2 1815 after determining the transmission beam pattern ID for the STA #1 1813.

The AP 1811 generates a self-interference DoA table (at operation 1817). A scheme of generating the self-interference DoA table may be the same as described above, and a detailed description thereof will be omitted herein. Then, an SLS process is performed among the AP 1811, the STA #1 1813, and the STA #2 1815 (at operation 1819). The SLS process performed among the AP 1811, the STA #1 1813, and the STA #2 1815 is identical to a general SLS process, and a detailed description thereof will be omitted herein.

Then, a reception beam pattern ID of the STA #1 1813 for a link between the AP 1811 and the STA #1 1813 is determined, and a transmission beam pattern ID of the STA #2 1815 for a link between the AP 1811 and the STA #2 1815 is determined through a BRP process among the AP 1811, the STA #1 1813, and the STA #2 1815 (at operation 1821). The BRP process in which the reception beam pattern ID of the link between the AP 1811 and the STA #1 1813 and the transmission beam pattern ID of the link between the AP 1811 and the STA #2 1815 are determined is identical to a general BRP process, and a detailed description thereof will be omitted herein.

After the reception beam pattern ID for the link between the AP 1811 and the STA #1 1813 is determined, and the transmission beam pattern ID of the link between the AP 1811 and the STA #2 1815 is determined, the AP 1811 transmits a BRP packet including a TX-TRN-REQ indicator and a TRN-T field to the STA #1 1813 (at operation 1823). Here, a value of the TX-TRN-REQ indicator is set to 1. After transmitting the BRP packet to the STA #1 1813, the AP 1811 updates a self-interference DoA table (at operation 1825). Since the AP 1811 generated the self-interference DoA table already, so the AP 1811 updates the self-interference DoA table. If the self-interference DoA table is not generated, the AP 1811 may generate the self-interference DoA table.

Meanwhile, the STA #1 1813 receives the BRP packet from the AP 1811, and generates channel measurement feedback information using the TRN-T field included in the received BRP packet. The STA #1 1813 includes the generated channel measurement feedback information into the next BRP packet to transmit the next BRP packet to the AP 1811 (at operation 1827). Here, the BRP packet includes a TX-TRAIN-RESPONSE indicating a response to transmit-training.

The AP 1811 receives the BRP packet transmitted by the STA #1 1813, determines a transmission beam pattern ID for the STA #1 1813 based on the channel measurement feedback information included in the BRP packet and the updated self-interference DoA table, and determines a reception beam pattern ID candidate for the STA #2 1815 (at operation 1829).

The AP 1811 transmits, to the STA #2 1815, a BRP packet including an L-RX indicator using the transmission beam pattern ID determined for the STA #2 1815 for requesting receive-training (at operation 1831). Here, a value of the L-RX indicator is set to a value greater than zero (0). The STA #2 1815 receives the BRP packet from the AP 1811, and transmits the next BRP packet including a TRN-R field to the AP 1811 (at operation 1833). Here, the BRP packet includes a RX-TRAIN-RESPONSE indicator indicating a response to receive-training.

The AP 1811 receives the BRP packet from the STA #2 1815, generates channel measurement information using a TRN-R field included in the received BRP packet, and determines a reception beam pattern ID for the STA #2 1815 based on the updated self-interference DoA table and the channel measurement information (at operation 1835).

Each of the AP 1811, the STA #1 1813, and the STA #2 1815 performs a link adaptation operation based on channel measurement feedback information, and performs a communication operation one another using the determined transmission beam pattern ID and reception beam pattern ID (at operation 1837). The link adaptation operation is an operation of adaptively determining a modulation scheme and a code rate based on the channel measurement feedback information, and a detailed description thereof will be omitted herein.

Still another example of a process for determining a transmission/reception beam pattern for operating a full-duplex scheme in a communication system supporting a beamforming scheme according to an embodiment of the present disclosure has been described with reference to FIG. 18, and still another example of a process for determining a transmission/reception beam pattern for operating a full-duplex scheme in a communication system supporting a beamforming scheme according to an embodiment of the present disclosure will be described with reference to FIG. 19.

Figure 19:
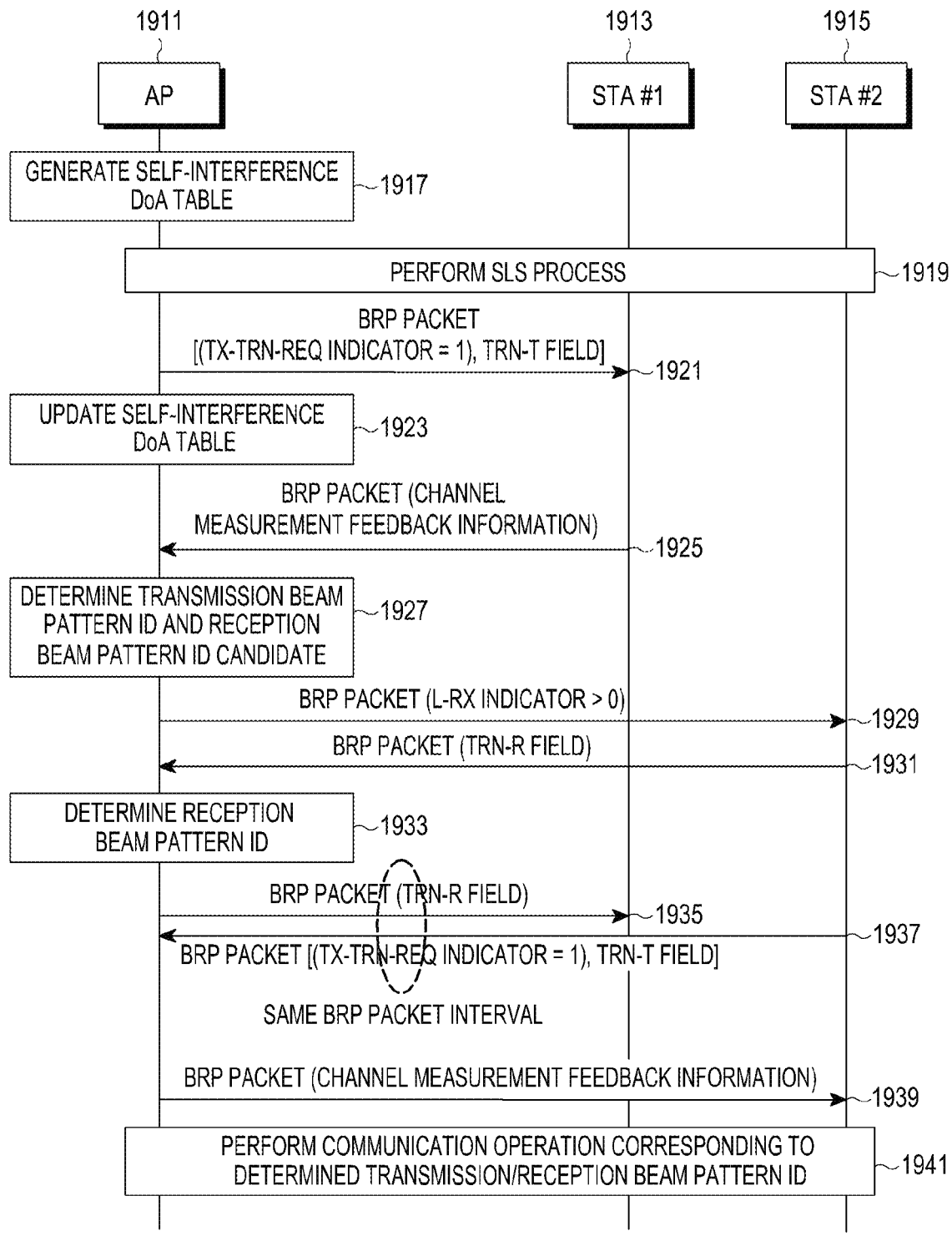
FIG. 19 schematically illustrates still another example of a process for determining a transmission/reception beam pattern for operating a full-duplex scheme in a communication system supporting a beamforming scheme according to an embodiment of the present disclosure.

FIG. 19 schematically illustrates still another example of a process for determining a transmission/reception beam pattern for operating a full-duplex scheme in a communication system supporting a beamforming scheme according to an embodiment of the present disclosure.

Referring to FIG. 19, it will be noted that a transmission/reception beam pattern determining process in FIG. 19 is a transmission/reception beam pattern determining process of determining a reception beam pattern ID after determining a transmission beam pattern ID based on a self-interference DoA in an AP in a unlimited full-duplex environment. The communication system includes an AP 1911, an STA #1 1913, and an STA #2 1915. Here, the AP 1911 firstly determines a transmission beam pattern ID for the STA #1 1913, and determines a transmission beam pattern ID for the STA #2 1915 after determining the transmission beam pattern ID for the STA #1 1913.

The AP 1911 generates a self-interference DoA table (at operation 1917). A scheme of generating the self-interference DoA table may be the same as described above, and a detailed description thereof will be omitted herein. Then, an SLS process is performed among the AP 1911, the STA #1 1913, and the STA #2 1915 (at operation 1919). The SLS process performed among the AP 1911, the STA #1 1913, and the STA #2 1915 is identical to a general SLS process, and a detailed description thereof will be omitted herein.

After the SLS process is performed among the AP 1911, the STA #1 1913, and the STA #2 1915, the AP 1911 transmits a BRP packet including a TX-TRN-REQ indicator and a TRN-T field to the STA #1 1913 (at operation 1921). Here, a value of the TX-TRN-REQ indicator is set to 1. After transmitting the BRP packet to the STA #1 1913, the AP 1911 updates a self-interference DoA table (at operation 1923). Since the AP 1911 generated the self-interference DoA table already, the AP 1911 updates the self-interference DoA table. If the self-interference DoA table is not generated, the AP 1911 may generate the self-interference DoA table.

Meanwhile, the STA #1 1913 receives the BRP packet from the AP 1911, and estimates channel measurement feedback information using the TRN-T field included in the received BRP packet. The STA #1 1913 includes the generated channel measurement feedback information into the next BRP packet to transmit the next BRP packet to the AP 1911 (at operation 1925). Here, the BRP packet includes an L-RX indicator for requesting receive-training, and a value of the L-RX indicator is set to a value greater than zero (0).

The AP 1911 receives the BRP packet transmitted by the STA #1 1913, determines a transmission beam pattern ID for the STA #1 1913 based on the channel measurement feedback information included in the BRP packet and the updated self-interference DoA table, and determines a reception beam pattern ID candidate for the STA #2 1915 (at operation 1927).

The AP 1911 transmits a BRP packet including an L-RX indicator to the STA #2 1915 for requesting receive-training (at operation 1929). Here, a value of the L-RX indicator is set to a value greater than zero (0). The STA #2 1915 receives the BRP packet from the AP 1911, and transmits the next BRP packet including a TRN-R field to the AP 1911 (at operation 1931).

The AP 1911 receives the BRP packet from the STA #2 1915, estimates channel measurement information using the TRN-R field included in the received BRP packet, and determines a reception beam pattern ID for the STA #2 1915 based on the updated self-interference DoA table and the channel measurement information (at operation 1933).

After determining the reception beam pattern ID for the STA #2 1915, the AP 1911 includes a TRN-R field into a BRP packet to transmit the BRP packet to the STA #1 1913 using the transmission beam pattern ID determined for the STA #1 1913 in the next BRP packet interval, i.e., the same BRP packet interval (at operation 1935), and receives a BRP packet from the STA #2 1915 using the reception beam pattern ID determined for the STA #2 1915 (at operation 1937). Here, the BRP packet includes a TX-TRN-REQ indicator, and a value of the TX-TRN-REQ indicator is set to 1. The BRP packet includes a TRN-T field.

The AP 1911 generates channel measurement feedback information using the TRN-T field included in the BRP packet received from the STA #2 1915, and transmits a BRP packet including the generated channel measurement feedback information to the STA #2 1915 (at operation 1939).

Each of the AP 1911, the STA #1 1913, and the STA #2 1915 performs a link adaptation operation based on channel measurement feedback information, and performs a communication operation one another using the determined transmission beam pattern ID and reception beam pattern ID (at operation 1941). The link adaptation operation is an operation of adaptively determining a modulation scheme and a code rate based on the channel measurement feedback information, and a detailed description thereof will be omitted herein.

Still another example of a process for determining a transmission/reception beam pattern for operating a full-duplex scheme in a communication system supporting a beamforming scheme according to an embodiment of the present disclosure has been described with reference to FIG. 19, and a process for determining a transmission/reception beam pattern and performing a scheduling operation by considering self-interference in a communication system supporting a beamforming scheme according to an embodiment of the present disclosure will be described with reference to FIG. 20.

Figure 20:
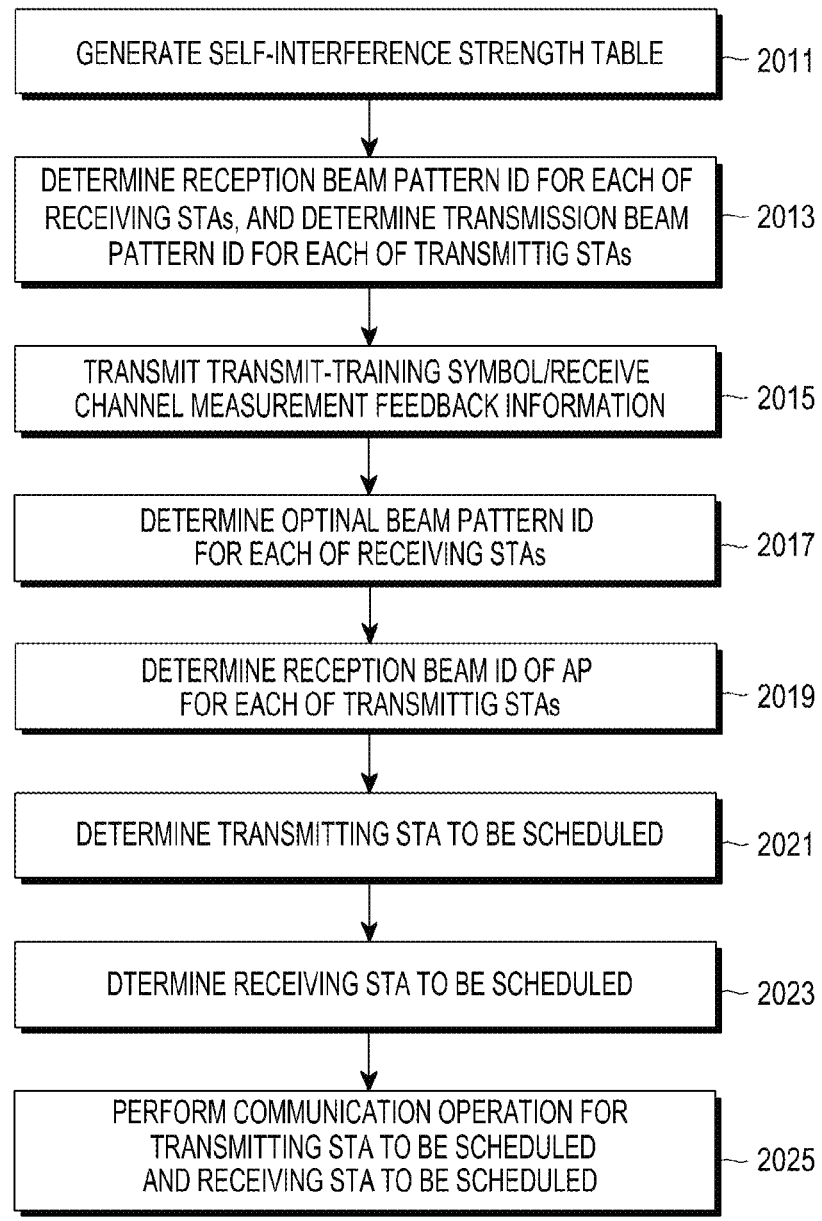
FIG. 20 schematically illustrates a process for determining a transmission/reception beam pattern and performing a scheduling operation by considering self-interference in a communication system supporting a beamforming scheme according to an embodiment of the present disclosure.

FIG. 20 schematically illustrates a process for determining a transmission/reception beam pattern and performing a scheduling operation by considering self-interference in a communication system supporting a beamforming scheme according to an embodiment of the present disclosure.

Referring to FIG. 20, an AP generates a self-interference strength table according to a transmission beam pattern ID and a reception beam pattern ID at operation 2011, and proceeds to operation 2013. The AP determines a reception beam pattern ID for each of receiving STAs to which the AP provides a service, and determines a transmission beam pattern ID for each of the transmitting STAs at operation 2013, and proceeds to operation 2015. The AP transmits transmit-training for determining a transmission beam pattern ID which the AP will use, and receives channel measurement feedback information from each of the receiving STAs at operation 2015, and proceeds to operation 2017. The AP determines an optional beam pattern ID for each of the receiving STAs based on the channel measurement feedback information received from each of the receiving STAs at operation 2017, and proceeds to operation 2019.

The AP receives a TRN-R field transmitted by each of the transmitting STAs, generates channel measurement information for each of the transmitting STAs using the TRN-R field received from each of the transmitting STAs, and determines a reception beam ID of an AP for each transmitting STA based on the generated channel measurement information at operation 2019, and proceeds to operation 2021. The AP determines a transmitting STA which the AP will schedule based on a contention-based scheme at operation 2021, and proceeds to operation 2023.

The AP determines a receiving STA which the AP will schedule based on the channel measurement feedback information for the transmitting STA to be scheduled at operation 2023, and proceeds to operation 2025. After determining the transmitting STA to be scheduled, the AP determines a reception beam pattern ID of the AP, and determines a receiving STA which has high channel quality which is high enough to minimally interferes with the determined reception beam pattern ID of the AP, that is, which enables full-duplex as the receiving STA to be scheduled. In a case that suppression of self-interference for an optimal transmission beam pattern ID for the receiving STA to be scheduled is not enough, the AP may determine another transmission beam pattern ID based on the channel measurement feedback information received from the receiving STAs.

The AP performs a communication operation for the determined transmitting STA to be scheduled and receiving STA to be scheduled at operation 2025.

Although each of FIGS. 3, 4, 6, 7, 8, 9, 10, 11, 16, 17, 18, 19, and 20 illustrates an example of a corresponding process, various changes could be made to each of FIGS. 3, 4, 6, 7, 8, 9, 10, 11, 16, 17, 18, 19, and 20. For example, although shown as a series of operations, various operations in each of FIGS. 3, 4, 6, 7, 8, 9, 10, 11, 16, 17, 18, 19, and 20 could overlap, occur in parallel, occur in a different order, or occur multiple times.

An inner structure of an AP in a communication system supporting a beamforming scheme according to an embodiment of the present disclosure will be described with reference to FIG. 21.

Figure 21:
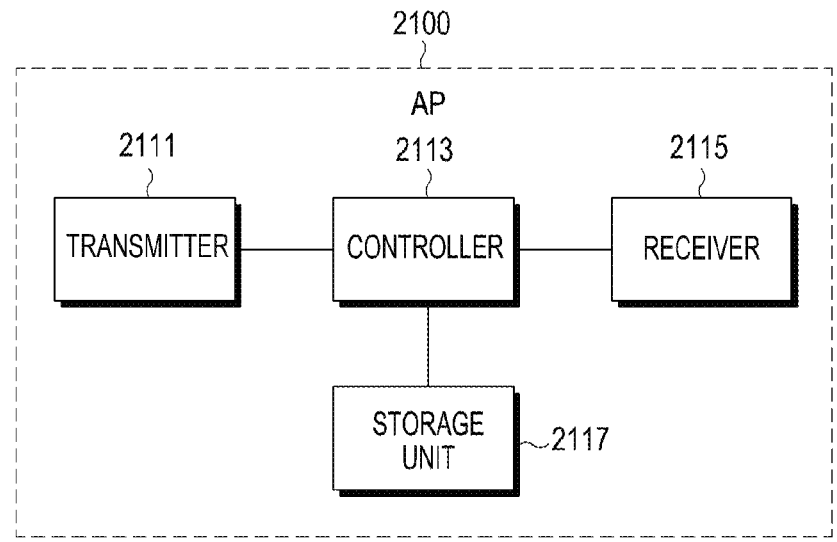
FIG. 21 schematically illustrates an inner structure of an AP in a communication system supporting a beamforming scheme according to an embodiment of the present disclosure.

FIG. 21 schematically illustrates an inner structure of an AP in a communication system supporting a beamforming scheme according to an embodiment of the present disclosure.

Referring to FIG. 21, an AP 2100 includes a transmitter 2111, a controller 2113, a receiver 2115, and a storage unit 2117.

The controller 2113 controls the overall operation of the AP 2100. The controller 2113 controls an operation related to an operation of operating a full-duplex scheme according to an embodiment of the present disclosure. The operation related to the operation of operating the full-duplex scheme according to an embodiment of the present disclosure has been described with reference to FIGS. 1 to 20 and a detailed description thereof will be omitted herein.

The transmitter 2111 transmits various signals, various messages, and/or the like to STAs, and/or the like under a control of the controller 2113. The various signals, the various messages, and/or the like transmitted in the transmitter 2111 have been described in FIGS. 1 to 20 and a detailed description thereof will be omitted herein.

The receiver 2115 receives various signals, various messages, and/or the like from the STAs, and/or the like under a control of the controller 2113. The various signals, the various messages, and/or the like received in the receiver 2115 have been described in FIGS. 1 to 20 and a detailed description thereof will be omitted herein.

The storage unit 2117 stores a program necessary for the operation of the AP 2100, various data, and/or the like, and more particularly, information related to the overall operation related to the operation of operating the full-duplex scheme according to an embodiment of the present disclosure. The storage unit 2117 stores the various signals, the various messages, and/or the like which the receiver 2115 receives from the STAs, and/or the like.

Although the transmitter 2111, the controller 2113, the receiver 2115, and the storage unit 2117 are described as separate processors in the AP 2100 in FIG. 21, it is to be understood that the AP 2100 may be implemented with a form into which at least two of the transmitter 2111, the controller 2113, the receiver 2115, and the storage unit 2117 may be incorporated.

The AP 2100 may be implemented with one processor.

An inner structure of an AP in a communication system supporting a beamforming scheme according to an embodiment of the present disclosure has been described with reference to FIG. 21, and an inner structure of an STA in a communication system supporting a beamforming scheme according to an embodiment of the present disclosure will be described with reference to FIG. 22.

Figure 22:
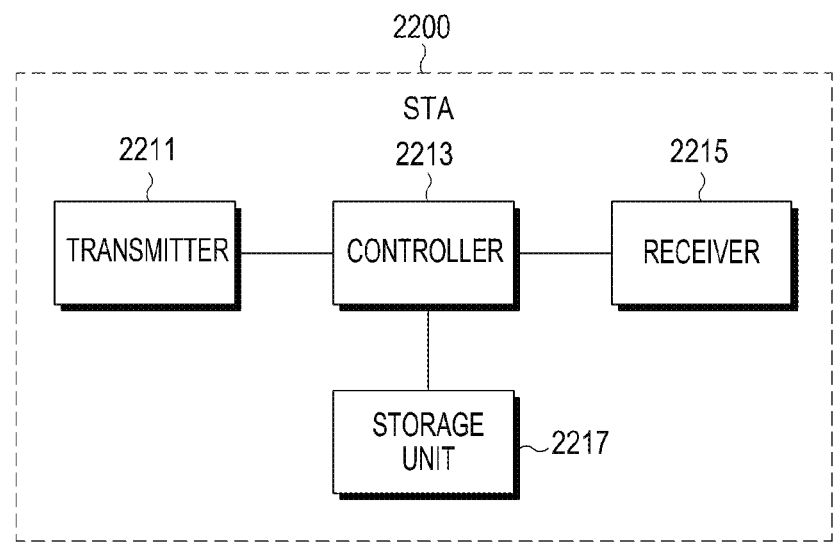
FIG. 22 schematically illustrates an inner structure of an STA in a communication system supporting a beamforming scheme according to an embodiment of the present disclosure.

FIG. 22 schematically illustrates an inner structure of an STA in a communication system supporting a beamforming scheme according to an embodiment of the present disclosure.

Referring to FIG. 22, an STA 2200 includes a transmitter 2211, a controller 2213, a receiver 2215, and a storage unit 2217.

The controller 2213 controls the overall operation of the STA 2200. The controller 2213 controls an operation related to an operation of operating a full-duplex scheme according to an embodiment of the present disclosure. The operation related to the operation of operating the full-duplex scheme according to an embodiment of the present disclosure has been described with reference to FIGS. 1 to 20 and a detailed description thereof will be omitted herein.

The transmitter 2211 transmits various signals, various messages, and/or the like to an AP, and/or the like under a control of the controller 2213. The various signals, the various messages, and/or the like transmitted in the transmitter 2211 have been described in FIGS. 1 to 20 and a detailed description thereof will be omitted herein.

The receiver 2215 receives various signals, various messages, and/or the like from the AP, and/or the like under a control of the controller 2213. The various signals, the various messages, and/or the like received in the receiver 2215 have been described in FIGS. 1 to 20 and a detailed description thereof will be omitted herein.

The storage unit 2217 stores a program necessary for the operation of the STA 2200, various data, and/or the like, and more particularly, information related to the overall operation related to the operation of operating the full-duplex scheme according to an embodiment of the present disclosure. The storage unit 2217 stores the various signals, the various messages, and/or the like which the receiver 2215 receives from the AP, and/or the like.

Although the transmitter 2211, the controller 2213, the receiver 2215, and the storage unit 2217 are described as separate processors in the STA 2200 in FIG. 22, it is to be understood that the STA 2200 may be implemented with a form into which at least two of the transmitter 2211, the controller 2213, the receiver 2215, and the storage unit 2217 may be incorporated.

The STA 2200 may be implemented with one processor.

An embodiment of the present disclosure enables to operate a full-duplex scheme in a communication system supporting a beamforming scheme.

An embodiment of the present disclosure enables to operate a full-duplex scheme by considering self-interference strength in a communication system supporting a beamforming scheme.

An embodiment of the present disclosure enables to operate a full-duplex scheme by considering a direction-of-arrival (DoA) in a communication system supporting a beamforming scheme.

An embodiment of the present disclosure enables to operate a full-duplex scheme based on a beam selection/nulling scheme in a communication system supporting a beamforming scheme.

An embodiment of the present disclosure enables to operate a full-duplex scheme by considering a channel rank in a communication system supporting a beamforming scheme.

An embodiment of the present disclosure enables to operate a full-duplex scheme by considering fading correlation in a communication system supporting a beamforming scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of an access point (AP) in a communication system, the method comprising:
  receiving channel measurement feedback information from a station (STA) to which the AP provides a service;
  identifying a beam pattern comprising a combination of an optimal transmission (Tx) beam pattern and an optimal reception (Rx) beam pattern for the STA based on the channel measurement feedback information and information related to self-interference of the AP; and
  communicating with the STA based on the identified beam pattern,
  wherein the information related to self-interference comprises a mapping table including self-interference strengths corresponding to a plurality of beam patterns of the AP, each of the plurality of beam patterns comprising a Tx beam pattern of the AP and a Rx beam pattern of the AP, and
  wherein each of the self-interference strengths is measured on an interference signal between a Tx beam pattern of the AP and a Rx beam pattern of the AP.

2. The method of claim 1, wherein at least one of the self-interference strengths for Tx beam patterns for each of the Rx beam patterns is measured by sweeping the Tx beam patterns for each of the Rx beam patterns.

3. The method of claim 1, wherein at least one of the self-interference strengths for Rx beam patterns for each of Tx beam patterns is measured by sweeping the Rx beam patterns for each of the Tx beam patterns.

4. The method of claim 1, wherein the channel measurement feedback information includes a beam pattern identifier (ID) which the STA prefers and channel quality information.

5. The method of claim 1, further comprising:
  updating the information related to self-interference.

6. A method of a station (STA) in a communication system, the method comprising:
  receiving channel measurement feedback information from an access point (AP);
  identifying a beam pattern comprising a combination of an optimal transmission (Tx) beam pattern and an optimal reception (Rx) beam pattern for the AP based on the channel measurement feedback information and information related to self-interference of the STA; and
  communicating with the AP based on the identified beam pattern,
  wherein the information related to self-interference comprises a mapping table including self-interference strengths corresponding to a plurality of beam patterns of the STA, each of the plurality of beam patterns comprising a Tx beam pattern of the STA and a Rx beam pattern of the STA, and
  wherein each of self-interference strengths is measured on an interference signal between a Tx beam pattern of the STA and a Rx beam pattern of the STA.

7. The method of claim 6, wherein at least one of the self-interference strengths for Tx beam patterns for each of Rx beam patterns is measured by sweeping the Tx beam patterns for each of the Rx beam patterns.

8. The method of claim 6, wherein at least one of the self-interference strengths for Rx beam patterns for each of Tx beam patterns is measured by sweeping the Rx beam patterns for each of the Tx beam patterns.

9. The method of claim 6, wherein the channel measurement feedback information includes a beam pattern identifier (ID) which the AP prefers and channel quality information.

10. The method of claim 6, further comprising:
updating the information related to self-interference.

11. An access point (AP) in a communication system, the AP comprising:
a transceiver configured to transmit or receive a signal; and
at least one processor coupled with the transceiver and configured to:
receive channel measurement feedback information from a station (STA) to which the AP provides a service,
identify a beam pattern comprising a combination of an optimal transmission (Tx) beam pattern and an optimal reception (Rx) beam pattern for the STA based on the channel measurement feedback information and information related to self-interference of the AP, and
communicate with the STA based on the identified beam pattern,
wherein the information related to self-interference comprises a mapping table including self-interference strengths corresponding to a plurality of beam patterns of the AP, each of the plurality of beam patterns comprising a Tx beam pattern of the AP and a Rx beam pattern of the AP, and
wherein each of self-interference strengths being measured on an interference signal between a Tx beam pattern of the AP and a Rx beam pattern of the AP.

12. The AP of claim 11, wherein at least one of the self-interference strengths for Tx beam patterns for each of Rx beam patterns is measured by sweeping the Tx beam patterns for each of the Rx beam patterns.

13. The AP of claim 11, wherein at least one self-interference strengths for Rx beam patterns for each of Tx beam patterns is measured by sweeping the Rx beam patterns for each of the Tx beam patterns.

14. The AP of claim 11, wherein the channel measurement feedback information includes a beam pattern identifier (ID) which the STA prefers and channel quality information.

15. The AP of claim 11, wherein the at least one processor is further configured to update the information related to self-interference.

16. A station (STA) in a communication system, the STA comprising:
a transceiver configured to transmit or receive a signal; and
at least one processor configured to:
receive channel measurement feedback information from an access point (AP),
identify a beam pattern comprising a combination of an optimal transmission (Tx) beam pattern and an optimal reception (Rx) beam pattern for the AP based on the channel measurement feedback information and information related to self-interference of the STA, and
communicate with the AP based on the identified beam pattern,
wherein the information related to self-interference comprises a mapping table including self-interference strengths corresponding to a plurality of beam patterns of the AP, each of the plurality of beam patterns comprising a Tx beam pattern of the STA and a Rx beam pattern of the STA, and
wherein each of self-interference strengths being measured on an interference signal between a Tx beam pattern of the STA and a Rx beam pattern of the STA.

17. The STA of claim 16, wherein at least one of the self-interference strengths for Tx beam patterns for each of Rx beam patterns is measured by sweeping the Tx beam patterns for each of the Rx beam patterns.

18. The STA of claim 16, wherein at least one of the self-interference strengths for Rx beam patterns for each of Tx beam patterns is measured by sweeping the Rx beam patterns for each of the Tx beam patterns.

19. The STA of claim 16, wherein the channel measurement feedback information includes a beam pattern identifier (ID) which the AP prefers and channel quality information.

20. The STA of claim 16, wherein the at least one processor is further configured to update the information related to self-interference.

* * * * *